(12) United States Patent
Griffin et al.

(10) Patent No.: US 8,843,183 B2
(45) Date of Patent: Sep. 23, 2014

(54) MOBILE COMMUNICATION DEVICE HAVING OVERLAPPING FIRST AND SECOND BODY MEMBERS

(75) Inventors: Jason Tyler Griffin, Waterloo (CA); Martin Riddiford, London (GB); James Reeves, Berkshire (GB); Joris Willem Beets, London (GB)

(73) Assignee: Blackberry Limited, Waterloo (CA)

( * ) Notice: Subject to any disclaimer, the term of this patent is extended or adjusted under 35 U.S.C. 154(b) by 201 days.

(21) Appl. No.: 12/687,947

(22) Filed: Jan. 15, 2010

(65) Prior Publication Data

US 2011/0177850 A1 Jul. 21, 2011

(51) Int. Cl.
- *H04M 1/00* (2006.01)
- *H04M 1/02* (2006.01)
- *G06F 1/16* (2006.01)

(52) U.S. Cl.
CPC ............ *H04M 1/0216* (2013.01); *G06F 1/1624* (2013.01); *G06F 1/1616* (2013.01); *G06F 1/1681* (2013.01)
USPC .................... 455/575.3; 455/575.1; 455/575.4

(58) Field of Classification Search
USPC .................................. 455/575.1, 575.3, 575.4
See application file for complete search history.

(56) References Cited

U.S. PATENT DOCUMENTS

| | | | |
|---|---|---|---|
| 5,103,376 A | 4/1992 | Blonder | |
| 5,255,214 A | 10/1993 | Ma | |
| 5,268,817 A | 12/1993 | Miyagawa et al. | |
| 5,276,589 A | 1/1994 | Bartlett et al. | |
| 5,410,447 A | 4/1995 | Miyagawa et al. | |
| 5,548,478 A | 8/1996 | Kumar et al. | |
| 5,644,469 A | 7/1997 | Shioya | |
| 5,706,167 A | 1/1998 | Lee | |
| 5,900,848 A | 5/1999 | Haneda et al. | |
| D416,003 S | 11/1999 | Schiefer et al. | |
| 6,005,767 A | 12/1999 | Ku et al. | |
| 6,266,236 B1 | 7/2001 | Ku et al. | |
| 6,434,371 B1 | 8/2002 | Claxton | |
| 6,532,147 B1 | 3/2003 | Christ, Jr. | |
| 6,556,435 B1 | 4/2003 | Helot et al. | |
| 6,700,773 B1 | 3/2004 | Adriaansen | |
| 6,827,409 B2 | 12/2004 | Michael | |
| 6,903,927 B2 | 6/2005 | Anlauff | |
| 7,079,872 B2 | 7/2006 | Khalid et al. | |
| 7,140,074 B2 | 11/2006 | Han et al. | |
| 7,197,346 B2 | 3/2007 | Eromaki et al. | |

(Continued)

FOREIGN PATENT DOCUMENTS

| EP | 1670218 A1 | 6/2006 |
|---|---|---|
| EP | 1699208 A1 | 9/2006 |

(Continued)

OTHER PUBLICATIONS

Extended European Search Report in respect of European Patent Application No. 10150910.7 dated Sep. 9, 2010.

(Continued)

*Primary Examiner* — Justin Lee
(74) *Attorney, Agent, or Firm* — Novak Druce Connolly Bove + Quigg LLP

(57) ABSTRACT

A mobile communication device and linkage mechanism are provided to enable an opened position of the device which is less than the total length of the lid and base members. In the opened position, a portion of the lid member overlaps the base member. The linkage mechanism may actuate translational movement of the lid member as the device is moved between the closed and opened positions.

15 Claims, 17 Drawing Sheets

(56) References Cited

U.S. PATENT DOCUMENTS

| | | | |
|---|---|---|---|
| 7,203,058 | B2 | 4/2007 | Hong |
| 7,221,562 | B2 | 5/2007 | Song |
| 7,277,275 | B2 | 10/2007 | Won et al. |
| 7,283,355 | B2 | 10/2007 | Han |
| 7,414,834 | B2 | 8/2008 | Ukonaho et al. |
| 7,418,275 | B2 | 8/2008 | Yiu |
| 7,512,426 | B2 | 3/2009 | Maatta et al. |
| 7,567,830 | B2 | 7/2009 | Hur |
| 7,599,181 | B2 | 10/2009 | Chuang et al. |
| 7,633,745 | B2 | 12/2009 | Sakakibara et al. |
| 7,725,988 | B2 | 6/2010 | Kim et al. |
| 7,844,915 | B2 | 11/2010 | Platzer et al. |
| 8,074,323 | B2 | 12/2011 | Lin |
| 8,086,290 | B2 | 12/2011 | Yoon et al. |
| 8,108,017 | B2 | 1/2012 | Jang et al. |
| 8,152,147 | B2 | 4/2012 | Yang |
| 8,186,781 | B2 | 5/2012 | Coleman et al. |
| 8,190,219 | B2 | 5/2012 | Park et al. |
| 8,205,305 | B2 | 6/2012 | Wang et al. |
| 8,265,719 | B2 | 9/2012 | Lindvall |
| 8,286,307 | B2 | 10/2012 | Cheng et al. |
| 8,290,549 | B2 | 10/2012 | Reeves et al. |
| 2002/0038493 | A1 | 4/2002 | Ko et al. |
| 2002/0126441 | A1 | 9/2002 | Kuo |
| 2003/0197745 | A1 | 10/2003 | Daly |
| 2005/0002158 | A1 | 1/2005 | Olodort et al. |
| 2005/0083644 | A1 | 4/2005 | Song |
| 2005/0099533 | A1 | 5/2005 | Matsuda et al. |
| 2005/0200608 | A1 | 9/2005 | Ulla et al. |
| 2006/0012563 | A1 | 1/2006 | Fyke et al. |
| 2006/0038795 | A1 | 2/2006 | Lee |
| 2006/0071916 | A1 | 4/2006 | Jeun et al. |
| 2006/0148543 | A1 | 7/2006 | Hunt |
| 2006/0252471 | A1 | 11/2006 | Pan |
| 2007/0086155 | A1* | 4/2007 | Chen et al. ............ 361/683 |
| 2007/0183123 | A1 | 8/2007 | Chuang |
| 2008/0000048 | A1 | 1/2008 | Petrella |
| 2008/0044007 | A1* | 2/2008 | Fujii ................ 379/433.13 |
| 2008/0068786 | A1 | 3/2008 | Cheng et al. |
| 2008/0161075 | A1 | 7/2008 | Kim et al. |
| 2008/0287167 | A1 | 11/2008 | Caine |
| 2009/0048006 | A1 | 2/2009 | Liao et al. |
| 2009/0061956 | A1 | 3/2009 | Matsuoka |
| 2009/0061959 | A1 | 3/2009 | Cheng et al. |
| 2009/0147458 | A1 | 6/2009 | Wang |
| 2009/0227301 | A1 | 9/2009 | Lindvall |
| 2010/0113100 | A1 | 5/2010 | Harmon et al. |
| 2010/0151924 | A1 | 6/2010 | Amano |
| 2010/0232102 | A1 | 9/2010 | Walker et al. |
| 2010/0296232 | A1 | 11/2010 | Yeh et al. |
| 2010/0299873 | A1* | 12/2010 | Song ....................... 16/236 |
| 2011/0038108 | A1 | 2/2011 | Chang |
| 2011/0221319 | A1 | 9/2011 | Law et al. |
| 2011/0312392 | A1 | 12/2011 | Reeves et al. |

FOREIGN PATENT DOCUMENTS

| | | |
|---|---|---|
| EP | 1760998 A2 | 3/2007 |
| EP | 1 838 072 A2 | 9/2007 |
| EP | 1835703 | 9/2007 |
| EP | 2031839 A1 | 3/2009 |
| JP | 2004235687 | 8/2004 |
| JP | 2004235687 A | 8/2004 |
| KR | 10-2006-0076338 | 7/2006 |
| WO | 2008056019 | 5/2008 |
| WO | 2008056019 A1 | 5/2008 |
| WO | 2009038375 | 3/2009 |
| WO | 2009099275 | 8/2009 |
| WO | 2009099275 A2 | 8/2009 |

OTHER PUBLICATIONS

Partial European Search Report in respect of European Patent Application No. 10150910.7 dated Jan. 6, 2010.
European Search Report for corresponding European Patent Application No. 10166228 dated Dec. 23, 2010, 7 pages.
Print out of <http://www.ecplaza.net/tradeleads/seller/4335838/friction_stay_hinge.html>, accessed at least on May 26, 2009.
Picture and description of MPH Cell Phone Hinge taken from <www.sugatsune.net/Industrial_Hardware_Components/Products/productdetails.cfm?CATID=7&SUBCATID=4&PRODUCTID=MPH>, accessed at least on May 26, 2009.
Picture and description of HG-JHW Soft-Close Dampening Hinge taken from <www.sugatsune.net/Industrial_Hardware_Components/Products/productdetails.cfm?CATID=7&SUBCATID=4&PRODUCTID=HG-JHW>, accessed at least on May 26, 2009.
Picture and description of HG-JH210 Lift Assist Hinge taken from <www.sugatsune.net/Industrial_Hardware_Components/Products/productdetails.cfm?CATID=7&SUBCATID=4&PRODUCTID=MPH> accessed at least on May 26, 2009.
"Extended European Search Report" issued from EP 11162200.7 on Jul. 7, 2011
Extended EP Search Report for EP 11162190.0 dated May 6, 2011.
English translation of Patent Abstract of Japan, Publication No. 2004235687 (Originally filed with the Information Disclosure Statement dated Nov. 10, 2010).
Print out of an English machine translation of JP 2004235687 obtained from <http://www4.ipdl.inpit.go.jp/Tokujitu/tjsogodben.ipdl?N0000=115> (Originally filed with the Information Disclosure Statement dated Oct. 25, 2011).
Print out of photograph and description of Kohjinsha SX series as retrieved from <http://www.engadget.com/2008/06/23/kohjinsha-sx-series-convertible-tablet-edges-out-of-umpc-territo/> on Sep. 9, 2009 (Originally filed with the Information Disclosure Statement dated Feb. 22, 2011).
Print out of <http://www.lcwprops.com/upload/catalog/lcw_4718.jpg> accessed at least on Sep. 1, 2009 (Originally filed with the Information Disclosure Statement dated Feb. 22, 2011).
Print out of a photograph of Electronic Rolodex w/Auto Dialfirst retrieved from <http://www.j-syscomputers.com/invtypageALL.htm> on Sep. 1, 2009 (Originally filed with the Information Disclosure Statement dated Feb. 22, 2011).
Printout of photograph of Lenovo ThinkPad X61 tablet PC as retrieved from <http://techcrunch.com/2007/05/18/lenovo-tablet-pc-with-santa-rosa/> (retrieved Dec. 16, 2010).
Printout of photograph and related news article of Dell Inspiron Duo convertible tablet as retrieved from <http://techreport.com/discussions.x/20012> (dated Nov. 18, 2010).
Printout of photograph of Dell Duo tablet as retrieved from <http://netbookreview.co.uk/wp-content/uploads/2010/11/dell-duo.jpg> (retrieved Dec. 3, 2010).
Printout of <http://www.itproportal.com/media-site/photos/dell_inspiron_duo.png> (retrieved Dec. 16, 2010).
Printout of <http://pencomputing.com/images/TPCEvosequence.jpg> (retrieved Dec. 9, 2010).
Printout of <http://www.ubergizmo.com/photos/2007/1/oqo_468.jpg> (retrieved Dec. 16, 2010).
Printout of article regarding Samsung GloriaWindows 7 tablet as retrieved from <http://www.engadget.com/2010/12/08/samsung-gloria-to-be-a-10-inch-windows-7-tablet-with-slide-out-k/> (dated Dec. 8, 2010).
Printout of article "Slide out that keyboard on Your iPhone 4" as retrieved from <http://www.yourtechreport.com/2010/11/18/slide-out-that-keyboard-on-your-iphone-4/> (dated Nov. 18, 2010).
Printout of article regarding Boxwave Keyboard Buddy as retrieved from <http://9to5mac.com/2010/11/17/boxwaves-keyboard-buddy-cases-gives-your-iphone-4-physical-keys/> (dated Nov. 17, 2010).
Printout of photographs of Phone with Full Slide-Out Keyboard as retrieved from <http://tradestead.com/images-phone-full-slide-out-keyboard-3-2-intuitive-touch-screen-wifi-recommend_p10990_n2.html> (retrieved Dec. 16, 2010).
Printout of article regarding Intel UrbanMax concept as retrieved from <http://www.engadget.com/2008/08/20/intels-urbanmax-concept-device-demonstrated-on-video/> (dated Aug. 20, 2008).
Printout of article entitled "Eking introduces a portable tablet with a slide-out keyboard" as retrieved from <http://liliputing.com/2010/07/eking-introduces-a-portable-tablet-with-a-slide-out-keyboard.html> (posted Jul. 22, 2010).

(56) References Cited

OTHER PUBLICATIONS

Printout of article entitled "Eking E5 UMPC brings tilting, sliding 5-inch display" as retrieved from <http://techfused.com/eking-e5-umpc-brings-tilting-sliding-5-inch-display> (dated Aug. 21, 2010).
Printout of article of entitled "Eking's Latest Portable Tablet With a Slide-Out Keyboard" as retrieved from <http://www.laptopinyo.com/tag/keyboard> (dated Jul. 23, 2010).
Printout of article of entitled "Eking M5 Side Slide MID arrives" as retrieved from <http://www.clonedinchina.com/2010/08/eking-m5-side-slide-mid-arrives.html> (dated Aug. 21, 2010).
Printout of photograph of Eking S515 Slider UMPC retrieved from <http://www.flickr.com/photos/umpcportal/4162816984/in/photostream/> (photo taken Dec. 6, 2009).
Printout of photograph and related description of vCoach folding desk stand as retrieved from <http://www.vcoach.net/VC/general/products/accessories.asp> (retrieved Dec. 9, 2010).
Printout of photograph and related description of Rocketfish Adjustable Notebook Stand as retrieved from <http://www.thisnext.com/item/AD19BBDB/EDCAD0F5/Rocketfish-Adjustable-Notebook> (retrieved Dec. 9, 2010).
Printout of <http://www.assistiveit.co.uk/images/laptop%20stand.jpg> (retrieved Dec. 9, 2010).
Printout of photograph and related description of Portabook as retrieved from <http://laptoppimp.com/laptop-accessories/the-portabook-laptop-stand/> (retrieved Dec. 9, 2010).
Printout of drawing and related article of Apple Convertible Tablet Patent as retrieved from <http://www.gottabemobile.com/2010/12/01/apple-convertible-tablet-patent-shows-a-unique-apin-on-familiar-form-factor/> (dated Dec. 1, 2010).
Printout of <http://laptoping.com/wp-content/acer_travelmate_c210_1.gif> (retrieved Dec. 16, 2010).
Printout of <http://pdab.net/img/clio_c1050.jpg> (retrieved Dec. 3, 2010).
Printout of <http://www.smartphonemag.com/_archives/Jan00/images/Vadem_Clio_group.jpg> (retrieved Dec. 3, 2010).
Printout of <http://thetabletpc.net/Photos-WinHEC/PICT0564.JPG>> (retrieved Dec. 16, 2010).
Printout of a picture of iPad Keyboard Dock retrieved from <http://reviews.cnet.com/keyboards/apple-ipad-keyboard-dock/4505-3134_7-34058880.html?tag=content;get-selector#reviewPage1>, posted on Apr. 20, 2010.
Printout of <http://www.tabletpc2.com/Review-HPTC1100.htm>, posted in Mar. 2004.
Printout of photographs of Flip mobile phone SIBA E381+ with Rotate 180 degrees camera (dual sim phone) retrieved from <http://www.alibaba.com/seo/buySeoLead.htm?SearchText=Flip%20mobile%20phone%20SIBA%20E381+%20with%20Rotate%20180%20degrees%20camera%20&IndexArea=product_en>, accessed on May 12, 2009.
Printout of <http://www.mobileburn.com/review.jsp?Id=2917>, first accessed at least on May 12, 2009.
Extended European Search Report in respect of European Patent Application No. 09180013.6 dated Jun. 14, 2010.
Extended European Search Report in respect of European Patent Application No. 11177100.2 dated Jan. 3, 2012.
Non-Final Office Action in respect of U.S. Appl. No. 12/816,552, dated Dec. 9, 2011.
Partial European Search Report in respect of European Patent Application No. 11177125.9 dated Nov. 15, 2011.
Extended European Search Report in respect of European Patent Application No. 11177125.9 dated Jan. 26, 2012.
U.S. Non-Final Office Action dated Jul. 18, 2013 that issued for U.S. Appl. No. 13/207,029.
Non-Final Office Action mailed Oct. 31, 2013, in corresponding U.S. Appl. No. 13/206,870.
Non-Final Office Action mailed Dec. 24, 2013; in U.S. Appl. No. 13/207,029.

\* cited by examiner

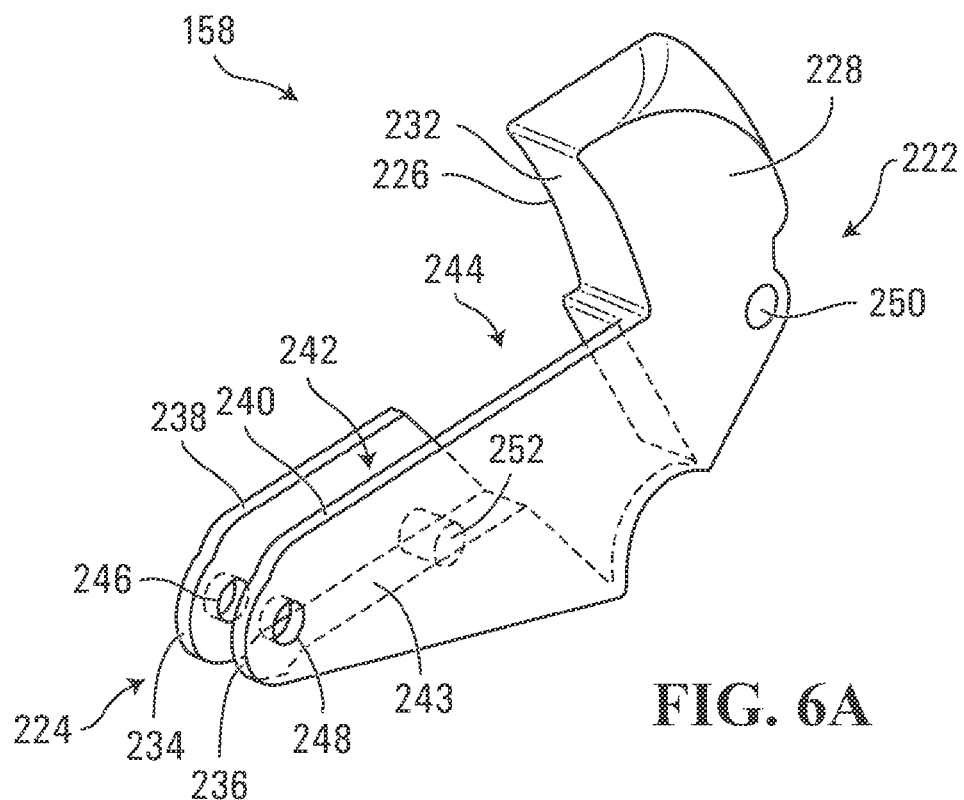
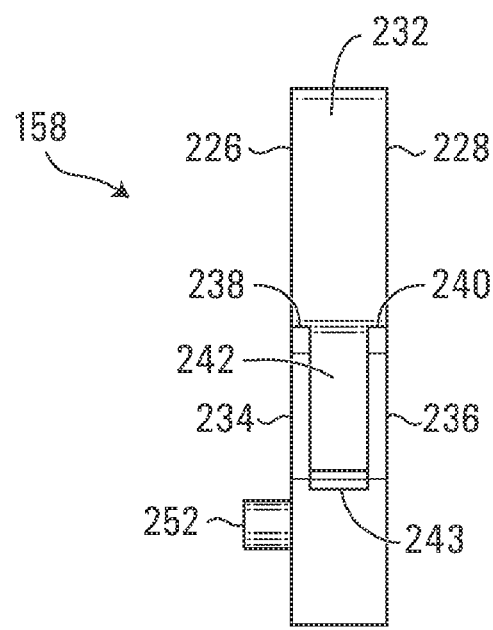
FIG. 6A
FIG. 6B

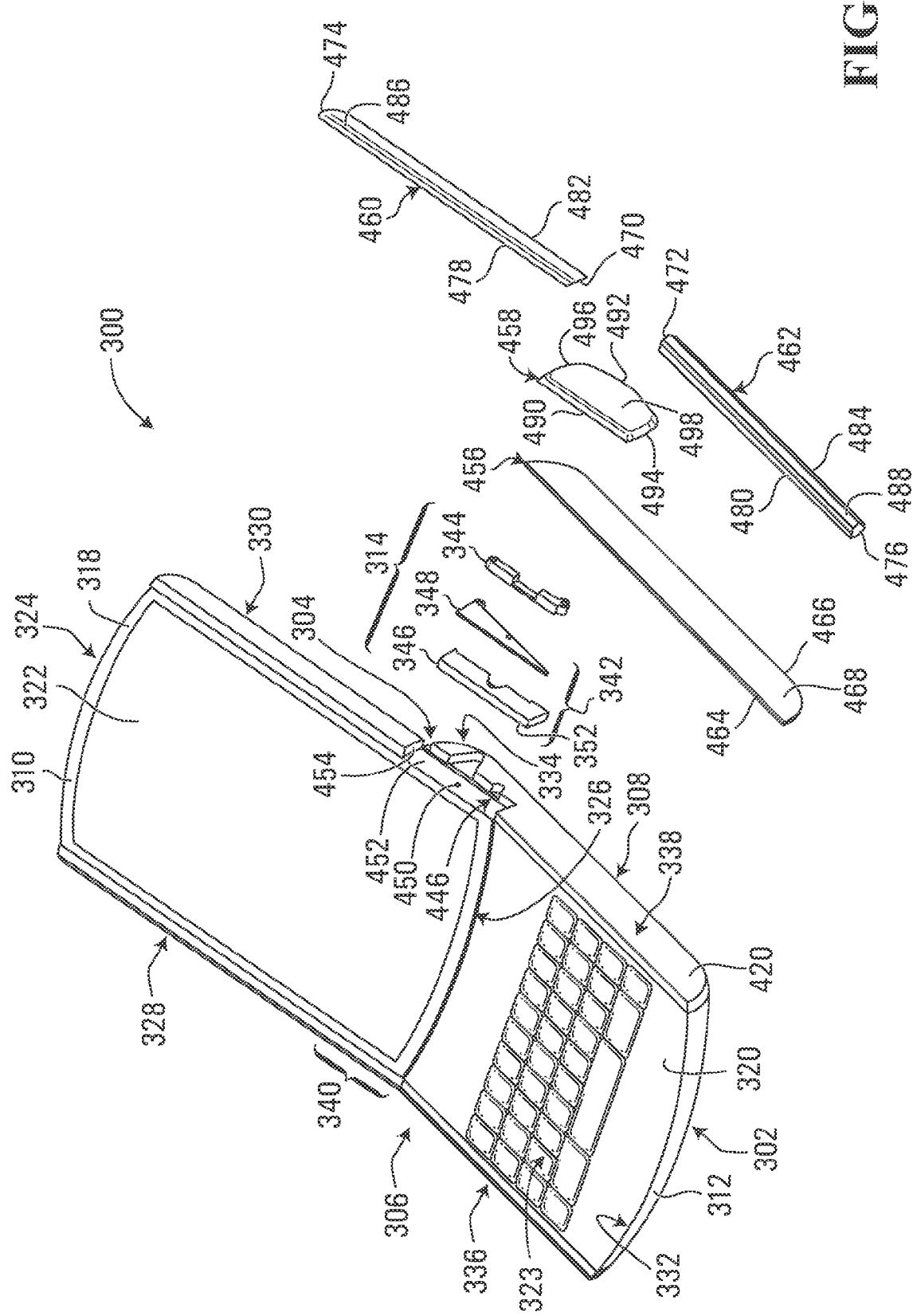

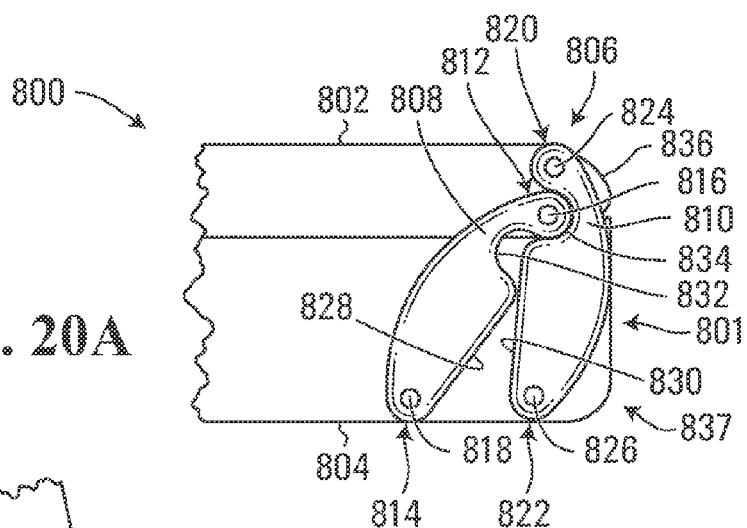
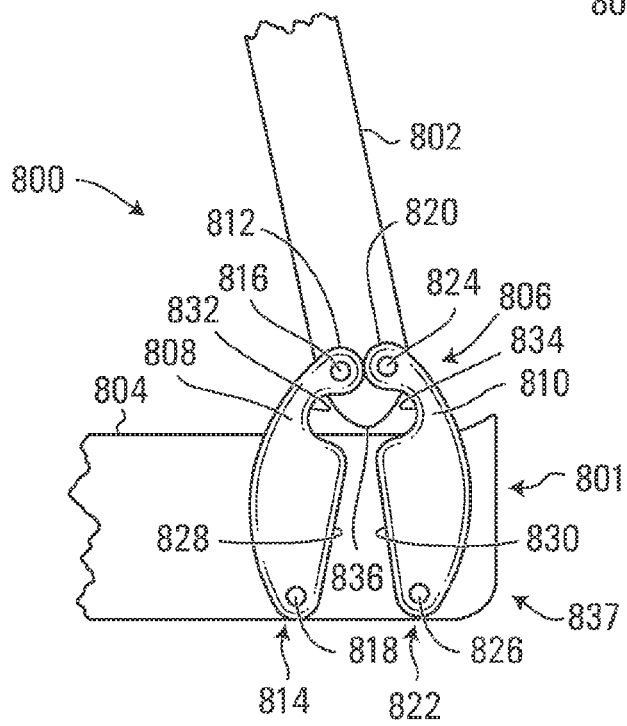
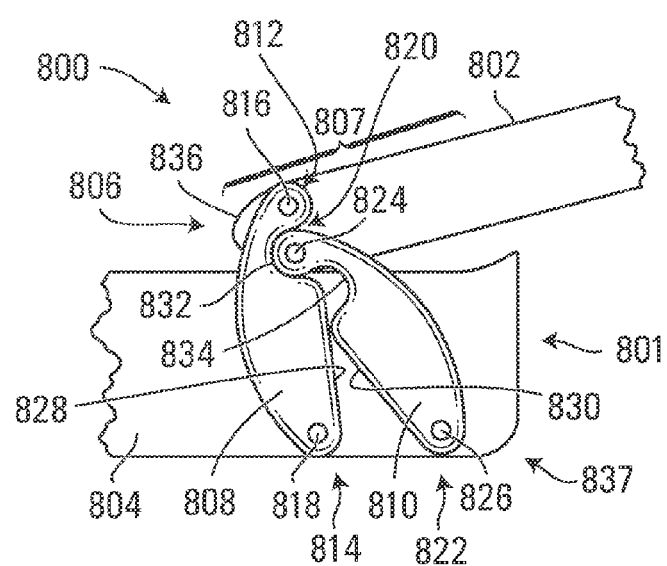
FIG. 20A
FIG. 20B
FIG. 20C

MOBILE COMMUNICATION DEVICE HAVING OVERLAPPING FIRST AND SECOND BODY MEMBERS

FIELD

The application relates to mobile communication devices, and more particularly to mobile communication devices having first and second body members which may be arranged in opened and closed positions.

BACKGROUND

A mobile communication device, such as a "flip phone" or "clamshell" type handheld mobile communication device, may have a linked end and an opposite free end. The device may comprise at least a first body member and a second body member which are coupled together at the linked end by a hinge or linkage mechanism such that the device can move between a closed position and an opened position. The first and second body members are commonly referred to as lid and base members respectively.

The lid and base members may commonly include a graphical display and keyboard respectively. The graphical display and keyboard can be on respective inner surfaces of the lid and base members. In the closed position, the inner surfaces of the lid and base members may be adjacent and not accessible to a user of the device. In the opened position, the inner surfaces may be accessible, and the graphical display and keyboard may, therefore, also be accessible to a user of the device.

It may be desirable to maximize the size of a graphical display in a mobile communication device. Since the lid and base members in a conventional mobile communication device may be approximately the same length, a conventional mobile communication device may be approximately two times as long in the opened position compared to the closed position. Therefore, in a conventional mobile communication device, an increase in the length of the lid member to accommodate a larger graphical display may result in twice the increase in overall length of the device in the opened position. Thus, there is a conventional design trade-off between increasing the size of a graphical display and maintaining a smaller size of the device in the opened position.

BRIEF DESCRIPTION OF THE DRAWINGS

Embodiments will now be described in greater detail with reference to the accompanying diagrams, in which:

FIG. 6A is a perspective view of a hinge base of the mobile communication device of FIG. 2A;

FIG. 6B is an end view of the hinge base of the mobile communication device of FIG. 6A;

FIG. 11 is a partially exploded perspective view of a mobile communication device according to a third embodiment in a fully opened position;

FIG. 20A is a partial side view of the mobile communication device according to a fifth embodiment in a closed position;

FIG. 20B is a partial side view of the mobile communication device of FIG. 20A in a partially opened position; and FIG. 20C is a partial side view of the mobile communication device of FIG. 20A in a fully opened position.

DETAILED DESCRIPTION

According to some embodiments, there is provided a mobile communication device comprising: a first member having a user interface; a second member; and a linkage mechanism. The linkage mechanism couples the first member and the second member such that the device has a closed position and an opened position. In the closed position, the user interface is inaccessible, and in the opened position, the user interface is accessible and a portion of the first member overlaps the second member.

For simplicity and consistency, the inner surfaces of the lid and base members are referred to herein as "inner" surfaces even when the device is in the opened position and the inner surfaces are accessible. Surfaces of the lid and base members which are accessible when the device is in both the closed position and the opened position will be referred to herein as "outer" surfaces. The term "user interface" may include a graphical display, a touchscreen, or other such interface elements.

In view of the conventional design trade-off between increasing the size of a graphical display and maintaining a smaller size of the device in the opened position, it may be desirable to utilize a linkage mechanism which allows a mobile communication device to accommodate a larger graphical display (i.e. a larger lid member) without increasing the length of the device in the opened position. Such a linkage mechanism may allow the graphical display to be larger than in a conventional mobile communication device while maintaining the same opened length as the traditional device. According to some embodiments, a mobile communication device may include a linkage mechanism designed such that a lid member overlaps a base member when the device is in the opened position.

Some embodiments may implement a simple pivot hinge as a linkage mechanism, wherein the pivot hinge is positioned a certain distance from a linked end of the device. By positioning the pivot hinge away from the linked end of the device, a portion of the lid member may rotate to overlap or overlie the base member when the device is in the opened position. An example embodiment implementing a simple pivot hinge will now be described with reference to FIG. 1.

Figure 1:
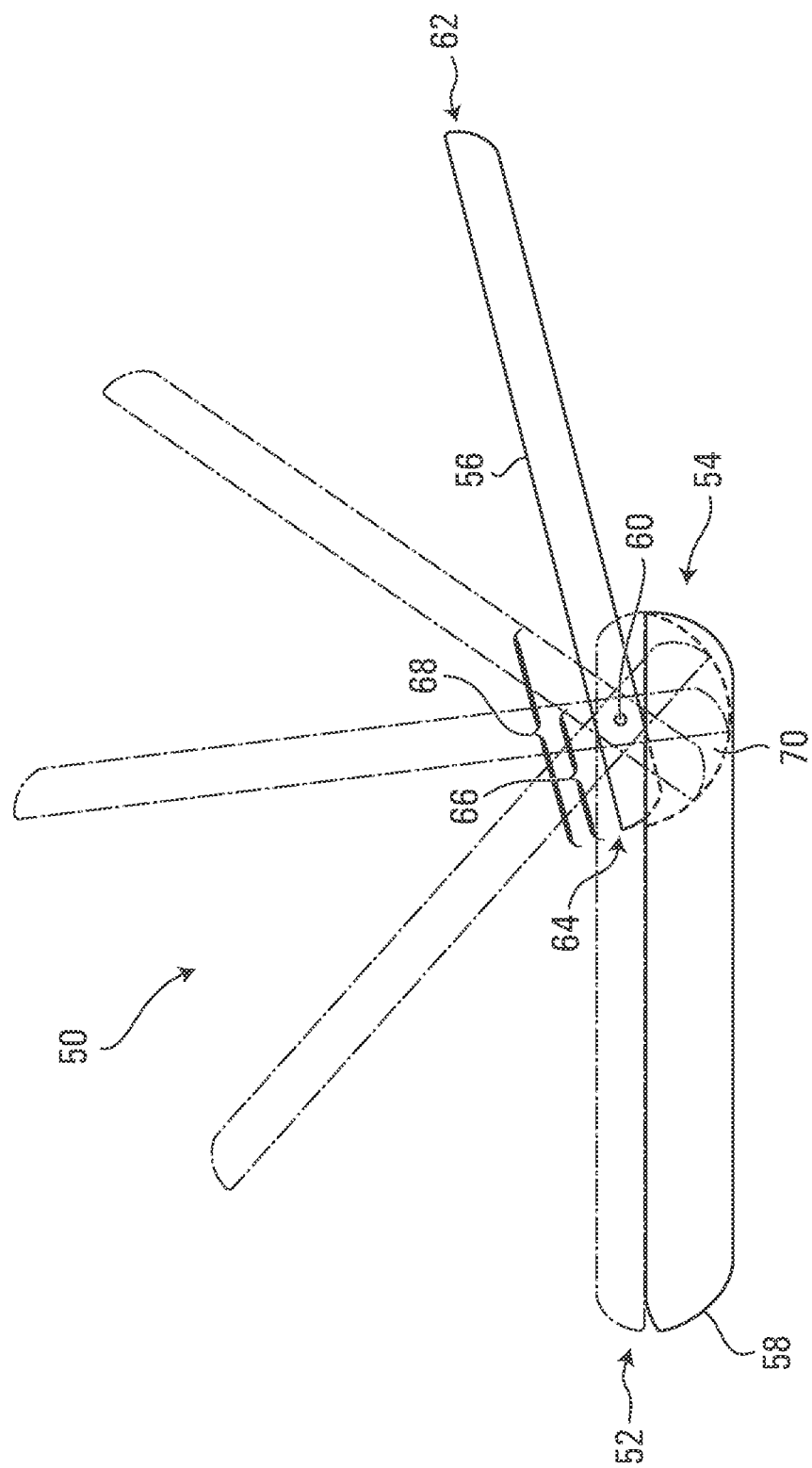
FIG. 1 is a side view of a mobile communication device having a pivot hinge according to a first embodiment in the opened position.

FIG. 1 is a side view of a flip phone device 50 in an opened position. It is to be understood that embodiments are not limited to flip phone or handheld mobile communication devices and some embodiments may be directed to other mobile communication devices such as portable computing devices.

The device 50 has a free end 52 and a linked end 54 and includes a first or lid member 56, a second or base member 58, and a pivot hinge 60. The lid member 56 has a first end 62 and a second end 64, and further includes an end portion 66 and an overlap portion 68. The overlap portion 68 includes the end portion 66. The end portion 66 is disposed between the pivot hinge 60 and the second end 64 of the lid member 56. The overlap portion 68 is the portion of the lid member 56 which overlaps or overlies the base member 58 in the opened position. In the embodiment shown in FIG. 1, the overlap portion 68 is approximately twice as long as the end portion 66.

In this embodiment, the base member 58 defines a clearance recess 70. As can be seen in FIG. 1, the base member 58 is thicker than the lid member 56 in order to provide sufficient space for clearance recess 70. Alternatively, a thinner base member with a through pocket to provide the necessary clearance could be used in some embodiments. There is a geometric relationship between the base member 58 thickness and the length of the lid member end portion 66. Specifically, the base member 58 thickness is larger than the length of the lid member end portion 66 to ensure clearance recess 70 remains internal to the base member 58.

In a closed position, the lid and base members 56 and 58 are substantially parallel and adjacent to each other. In the opened position (shown in FIG. 1), the lid and base members 56 and 58 are disposed at an angle to each other. Dash lines are used to show discrete positions of the lid member 56 as the device 50 is moved between the closed and fully opened positions. Other dotted lines in the figures, including FIG. 1, are used to show elements or parts of elements that are hidden behind other elements shown in the respective figures.

The pivot hinge 60 is located toward the linked end 54 of the device 50 and rotatably couples the lid and base members 56 and 58. The lid member 56 and the base member 58 can be rotated about the pivot hinge 60 between the closed position and the opened position. The end portion 66 of the lid member 56 moves through clearance recess 70 of the base member 58 as the lid member 56 rotates with respect to the base member 58. The overlap portion 68 of the lid member 56 overlaps the base member 58 at the linked end 54 of the device 50 when the device is in the opened position. Due to the overlap of the lid and base members, the device is not twice as long as either the lid or base member 56 or 58 when opened.

According to some embodiments, a mobile communication device comprises a linkage mechanism configured to allow translational movement of a lid member with respect to a base member during the movement of a device from a closed to an opened position. For example, the linkage mechanism may be a "double" or "split hinge" in some embodiments although other types of linkage mechanisms are possible as will be described below. Allowing translational movement of the lid member may reduce clearance space required by the lid member with respect to the first member for opening and closing the device.

In some embodiments, the mobile communication device may actuate the translational movement in response to moving the device between the closed and opened positions. For example, a base member of the device may include a cam surface which interacts with a lid member to drive the translational movement of the lid member with respect to the base member. Other methods of actuating or driving the translational movement are possible as will be explained below. In some embodiments, the linkage mechanisms may actuate the translational movement in response to movement of the device from the closed to the opened position.

A further embodiment of a flip phone device will now be described with reference to FIGS. 2A to 10C. Again, it is to be understood that embodiments are not limited to flip phone devices and embodiments may comprise other mobile communication devices. The embodiment described with reference to FIGS. 2A to 10C is only an example of a device according to one possible embodiment.

Figure 2A:
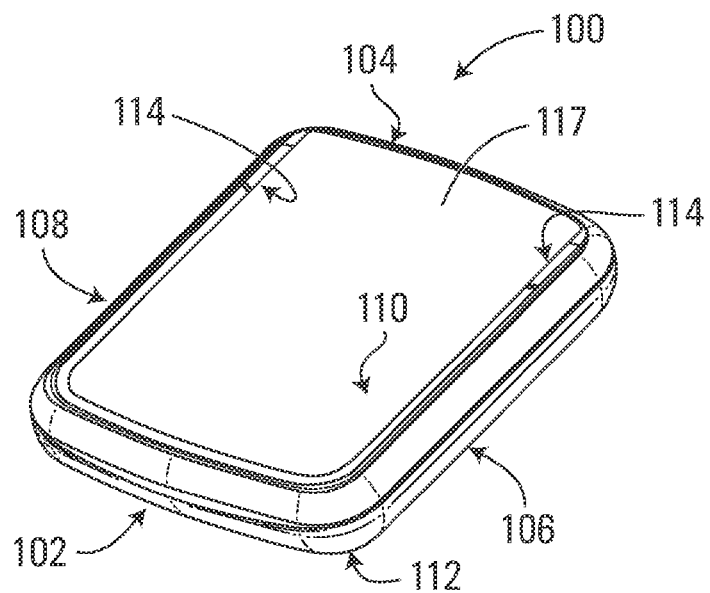
FIG. 2A is a perspective view of a mobile communication device according to a second embodiment in a closed position.
Figure 2B:
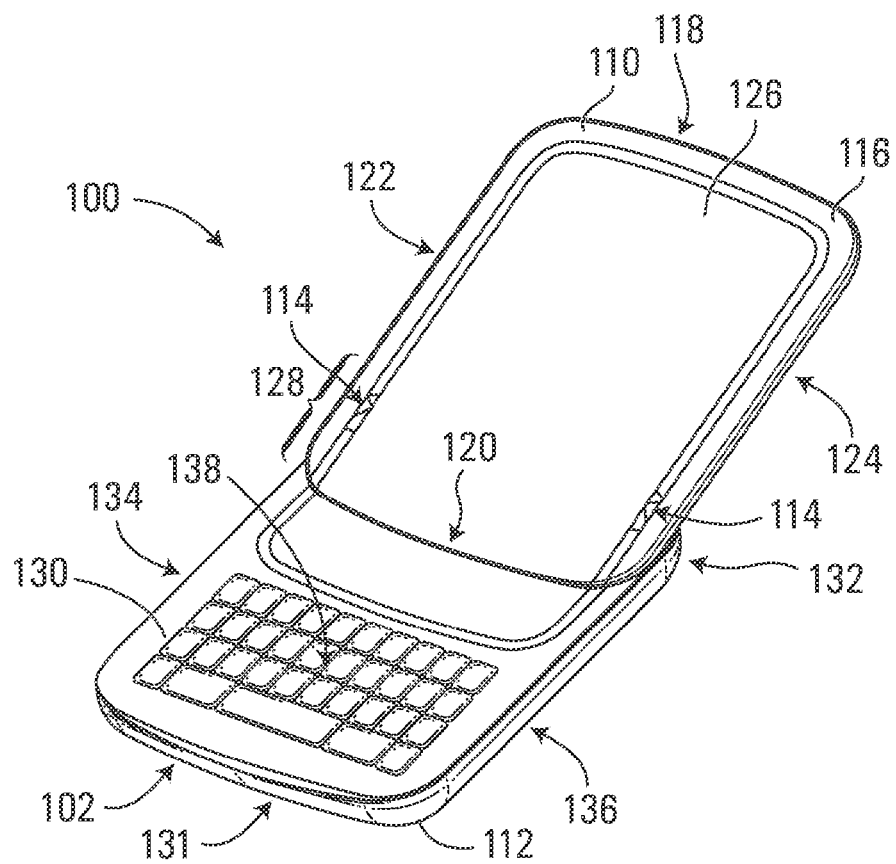
FIG. 2B is a perspective view of the mobile communication device of FIG. 2A in a fully opened position.

FIGS. 2A and 2B are each perspective views of a flip phone device 100 in a closed position and an opened position respectively. The device 100 has a free end 102, an opposite linked end 104, a first device side 106 and an opposite second device side 108 (all shown in FIG. 2A). The device 100 includes a first or lid member 110, a second or base member 112, and a linkage mechanism 114. The linkage mechanism 114 in this embodiment is an expandable multi-pivot hinge.

The linkage mechanism 114 is disposed near linked end 104 and includes two sets of mirrored elements located inward from respective first and second device sides 106 and 108. In some embodiments, however, elements of the linkage mechanism 114 may only be disposed at or near one of the device sides 106 or 108 of the device 100. The linkage mechanism 114 is described in more detail below with reference to FIGS. 5A to 10C.

In the remaining discussion of the device 100, the direction extending perpendicularly away from the base member 112 and toward the lid member 110, when the device 100 is in the closed position, will be referred to as the upward direction. Conversely, the opposite direction will be referred to as the downward direction. The direction extending from the linked end 104 toward the free end 102 of the device 100, when the device 100 is in the closed position, will be referred to as the forward direction. Conversely, the opposite direction will be referred to as the backward direction. The upward, downward, forward and backward directions are referenced to the base member 112 which is shown as remaining stationary relative to other elements of the device 100 in the figures. These reference directions are for ease of description and do not require any particular orientation of the elements of the device 100 including the base member 112.

The lid member 110 has a respective inner lid member surface 116 (shown in FIG. 2B), and an outer lid member surface 117 (shown in FIG. 2A) opposite to the inner lid member surface 116. The lid member 110 has a first lid member end 118, an opposite second lid member end 120, a first lid member side 122 and an opposite second lid member side 124 (all shown in FIG. 2B). In this embodiment, the lid member 110 includes a graphical display 126 (shown in FIG. 2B) on the inner lid member surface 116, although other user interface elements such as a touchscreen may be present on a lid member in some embodiments. The lid member 110 also has an overlap portion 128 (shown in FIG. 2B).

The base member 112 has an inner base member surface 130, an opposite outer base member surface (not shown), a first base member end 131, an opposite second base member end 132, a first base member side 134 and an opposite second base member side 136 (all shown in FIG. 2B). In this embodiment, the base member 112 includes a keyboard 138 on the inner base member surface 130.

It is to be understood that embodiments are not limited to those having a graphical display and keyboard exclusively on respective lid and base members (or base covers). In some embodiments, keys or a keyboard may also be present on the lid member. Similarly, in some embodiments a graphical display may be located on the base member or in other locations in addition to a graphical display on the lid member. A lid or base member may also have multiple graphical displays with one or more on a surface other than an inner surface in some embodiments. Further, the keyboard 138 may be a virtual keyboard provided on a touch screen display (not shown).

In this embodiment, the device 100 has both closed and opened positions. In the closed position, the inner lid and base member surfaces 116 and 130 are not accessible. Thus, the graphical display 126 and the keyboard 138 are not accessible. The overlap portion 128 of the lid member 110 overlaps the base member 112 at the linked end 104 of the device 100 when the device 100 is in the opened position such that the graphical display 126 and the keyboard 138 are totally accessible. Therefore, the overall length of the device in the opened position is less than twice the length of either the lid or the base members 110 or 112. Embodiments are not limited to the closed and opened positions described above, and other closed and opened positions may be possible. For example, a lid member could be rotated 180 degrees with respect to a base member.

The linkage mechanism 114 rotatably couples the lid and base members 110 and 112 near their respective second lid and base member ends 120 and 132 and enables movement of the device 100 between the closed and opened positions. The lid member 110 is rotated with respect to the base member 112 in order to move the device 100 between the opened and closed positions. The second lid and base member ends 120 and 132 are aligned at the linked end 104 of the device 100 when the device 100 is in the closed position. Similarly, the first lid and base member ends 118 and 131 are aligned at the free end 102 of the device 100 when the device is in the closed position.

Figure 3:
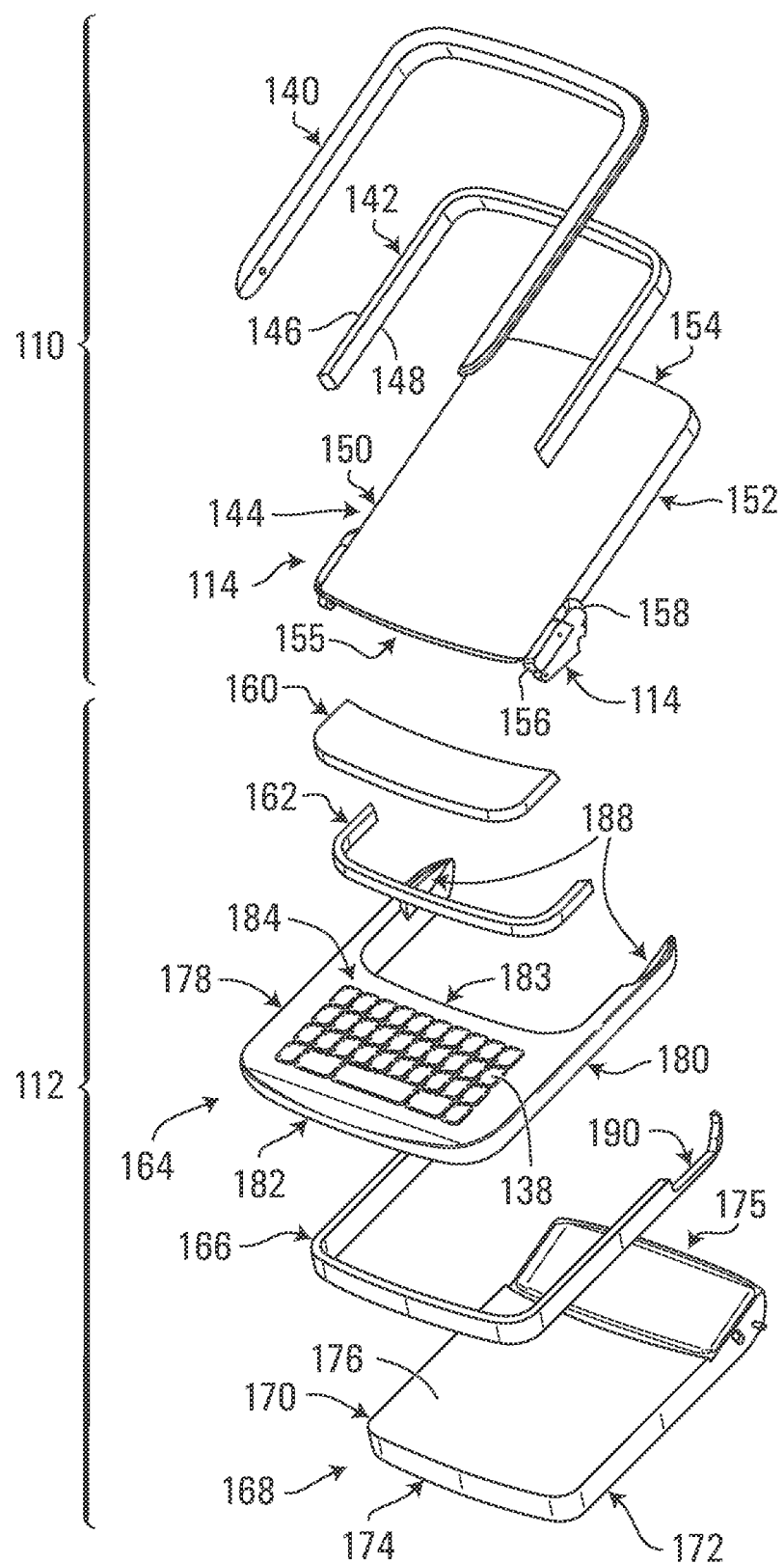
FIG. 3 is a partially exploded perspective view of the mobile communication device of FIG. 2A.

As shown in FIG. 3, the lid and base members 110 and 112 comprise trims and covers, and the linkage mechanism 114 is integral to the lid and base members 110 and 112. Specifically, the trims and covers of the lid and base members cover and hide, or partially hide, the linkage mechanism 114. The trims and covers of the device 100 will now be described with reference to FIG. 3. FIG. 3 is a partially exploded perspective view of the device 100.

In this embodiment, the lid member 110 includes a lid external cover 140, a lid trim 142, and a lid member body 144. The lid trim 142 and the lid external cover 140 are both generally U-shaped. The lid trim 142 has an inner lid trim surface 146 and an opposite outer lid trim surface 148. The lid member body 144 has a first lid member body side 150, an opposite second lid member body side 152, a first lid member body end 154, and an opposite second lid member body end 155. It is to be understood that some embodiments may not comprise the lid trim 142 and/or the lid external cover 140.

As assembled, the lid cover 140, the lid trim 142, and the lid member body 144 are fixedly connected. The lid trim 142 surrounds the first lid member body side 150, the second lid member body side 152 and the first lid member body end 154. The lid trim 142 terminates on each of the first lid member side 122 and the second lid member side 124 at the linkage mechanism 114. The lid external cover 140 surrounds the lid trim 142 and the linkage mechanism 114. The lid external cover 140 form the first and second lid member sides 122 and 124 (shown in FIG. 2B) and the first lid member end 118 (also shown in FIG. 2B). The second lid member body end 155 forms the second lid member end 120 (shown in FIG. 2B).

In this embodiment, the linkage mechanism 114 includes a first hinge piece or hinge lid 156 and a second hinge piece or hinge base 158. In FIG. 3, the linkage mechanism 114 is shown partially assembled and connected to the lid member body 144. As will be discussed in more detail below, as fully assembled, the linkage mechanism is also connected to the base member body 168.

In this embodiment, the base member 112 includes a base inlay 160, a base trim top 162, a base cover 164, a base trim bottom 166 and a base member body 168. The base member body 168 has a first base member body side 170, a second base member body side 172, a first base member body end 174, and an opposite second base member body end 175. The base member body 168 has an inner base member body surface 176. The base trim bottom 166 is generally U-shaped and is shaped to fit around the first base member body side 170, the second base member body side 172 and the first base member body end 174. The base trim bottom 166 has trim bottom recesses 190 which are shaped to provide clearance for the linkage mechanism 114.

The base cover 164 includes a first base cover side 178, an opposite second base cover side 180, a first base cover end 182, a second base cover end 183, and a base cover user interface surface 184. The base cover user interface surface cover 184 extends between the first base cover side 178 and the second base cover side 180. The base cover user interface 184 also extends from the first base cover end 182 approximately midway along the length of the first base cover side 178 and the second base cover side 180 and terminates at the second base cover end 183. The first base cover side 178, the second base cover side 180, and the first base cover end 182 are shaped to cover the base trim bottom 166. More specifically, the base trim bottom 166 is shaped to be received between the first base cover side 178, the second base cover side 180, and the first base cover end 182 such that the base cover 164 overlies and surrounds the base trim bottom 166. The base cover user interface 184 is shaped to fit over a portion of the inner base member body surface 176. A base cover recess 188 is disposed in each of the first and second base cover sides 178 and 180 of the base cover 164 and are each shaped to provide clearance of the lid member 110. The form of the base cover recess 188 depends on the form of the lid member 110. In some embodiments, a lid member may be shaped such that the base cover recess 188 may be omitted. For example, a lid member may include recesses to provide clearance for the base member. The base cover 164 includes the keyboard 138 on the base cover user interface surface 184, although it is contemplated that a touch screen user interface may alternatively be provided, for example.

The base trim top 162 is generally U-shaped and is shaped to be received between the second base cover end 183, the first base cover side 178 and the second base cover side 180. The base inlay 160 is shaped to be received in the base trim top 162 and may include an additional user interface touch screen, track ball or other interface elements. It is to be understood that some embodiments may omit the base inlay 160, the base trim bottom 166, or the base cover 164.

As assembled, the base inlay 160, the base trim top 162, the base cover 164, the base trim bottom 166 and the base member body 168 are fixedly connected. The base trim bottom 166 covers the first base member body side 170, the second base member body side 172 and the first base member body end 174. The first base cover side 178, the second base cover side 180, and the first base cover end 182, of the base cover 164 cover the base trim bottom 166 and form the first and second base member sides 134 and 136 (shown in FIG. 2B) and the first base member end 131 (shown in FIG. 2B) respectively. The second base member body end 175 forms the second base member end 132 (shown in FIG. 2B). The base surface cover 184, the base trim top 162, and the base inlay 160 fit together to cover the inner base member body surface 176.

Figure 4A:
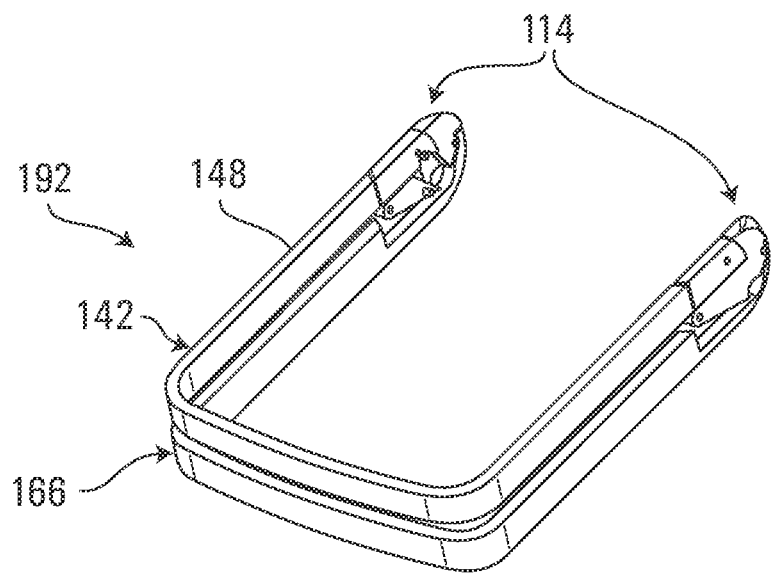
FIG. 4A is a perspective view of a first mechanism ring of the mobile communication device of FIG. 2A in the closed position.

FIG. 4A is a perspective view of a first mechanism ring 192, when the device 100 (shown in FIG. 2A) is in the closed position. The first mechanism ring 192 is a continuous ring that loops around the top of the device 100, through the hinge and around the bottom of the device 100. The first mechanism ring 192 includes the linkage mechanism 114, the lid trim 142, and the base trim bottom 166. The linkage mechanism 114 is flush with the outer lid trim surface 148 (shown in FIG. 3) and the outer lid member surface 117 (shown in FIG. 2A) when the device 100 is in the closed position.

Figure 4B:
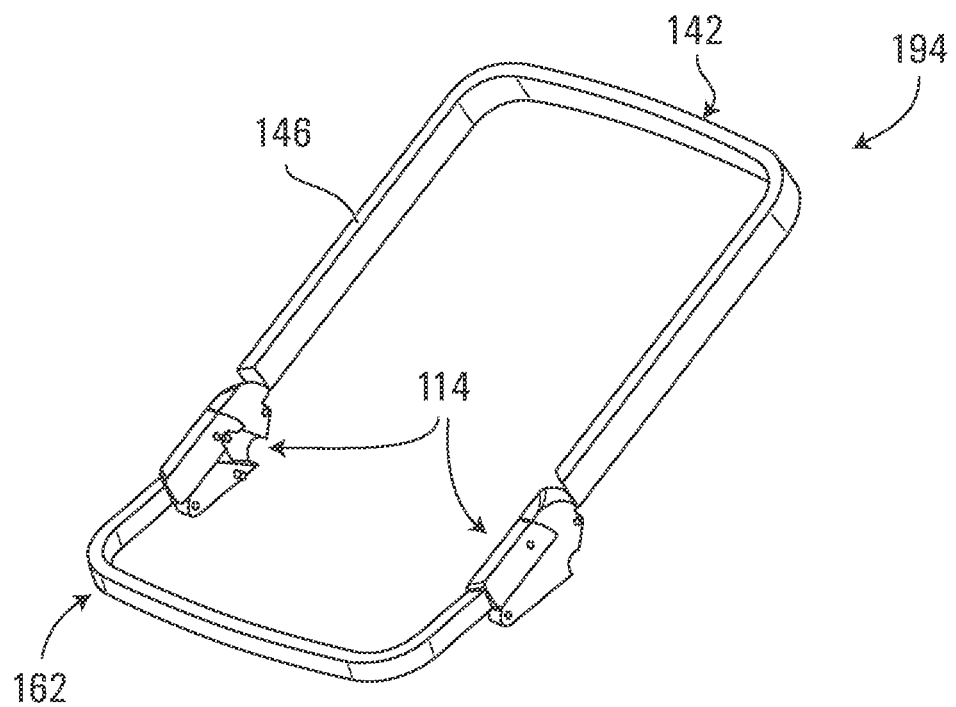
FIG. 4B is a perspective view of a second mechanism ring of the mobile communication device of FIG. 2B in the opened position.

FIG. 4B is a perspective view of a second mechanism ring 194 when the device 100 (shown in FIG. 2B) is in the opened position. The second mechanism ring 194 includes the linkage mechanism 114, the lid trim 142, and the base trim top 162. The linkage mechanism 114 is flush with the inner lid trim surface 146 and the inner lid member surface 116 (shown in FIG. 2B) when the device is in the opened position.

The first and second mechanism rings 192 and 194 in this embodiment may serve an aesthetic function of better visually integrating the linkage mechanism into the device by making the linkage device appear less conspicuous. For example, the linkage mechanism 114, the lid trim 142, the base trim top 162 and the base trim bottom 166 may comprise a different material than other elements of the lid and base members discussed above, although embodiments are not so limited. For example, the lid external cover 140 and the base cover 164 could comprise mainly plastic while the lid trim 142, the base trim top 162, the base trim bottom 166 and the linkage mechanism 114 could comprise a metal, although embodiments are not so limited.

It is to be understood that the design of the device 100, including the lid and base members 110 and 112 and the first and second mechanism rings 192 and 194 shown in FIGS. 4A and 4B, are only an example of possible embodiments. Embodiments are not limited to those comprising lid and base covers and trims, or to linkage mechanisms located inward from the first device side 106 and the second device side 108. For example, no covers and trims may be present in some embodiments, and the linkage mechanism may be disposed on sides or elsewhere on a device in some embodiments.

The linkage mechanism 114 allows translational movement of the lid member 110 for at least part of the movement between the opened and the closed positions as will be described with reference to FIGS. 5A to 10C.

The individual elements of the device 100, including the linkage mechanism 114, will now be described with reference to FIGS. 5A to 8B. For simplicity and clarity, only the elements of the linkage mechanism 114 near the first device side 106 of the device 100 (shown in FIG. 2A) will be described although it is to be understood that, in this embodiment, these elements are mirrored on the opposite second device side 108 of the device 100 (shown in FIG. 2A). It is to be understood that embodiments are not limited to linkage mechanisms with mirrored elements near each side of a device. A linkage mechanism in some embodiments may include elements near or at one side of the device only. Alternatively, the linkage mechanism may be located at another location, such as a central location between the sides of the device.

In the embodiment shown in FIGS. 2A and 2B, the linkage mechanism 114 is a "split hinge" or a "double hinge". Linkage mechanism 114 includes the hinge lid 156 and the hinge base 158 (shown in FIG. 3).

Figure 5A:
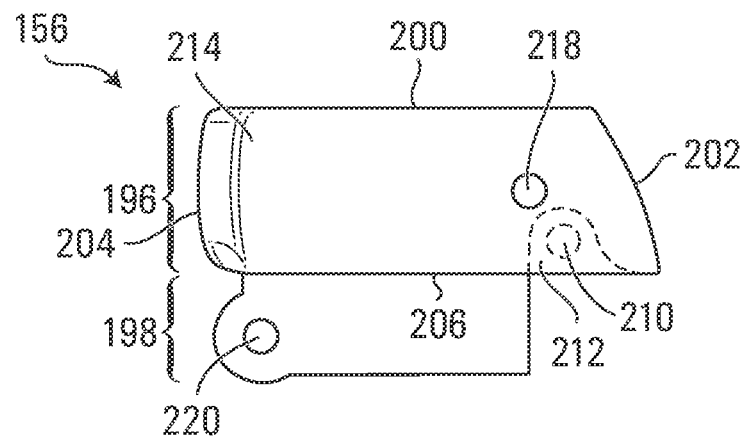
FIG. 5A is a side view of a hinge lid of the mobile communication device of FIG. 2A.
Figure 5B:
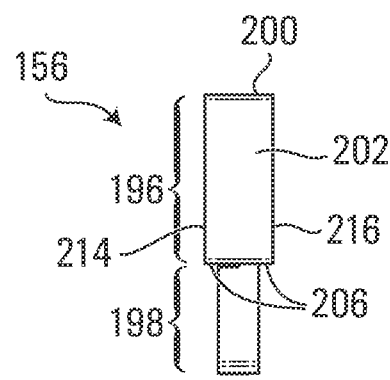
FIG. 5B is an end view of the hinge lid of the mobile communication device of FIG. 5A.
Figure 5C:
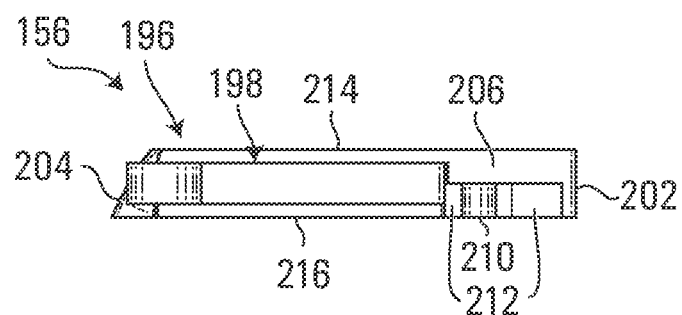
FIG. 5C is a bottom view of the hinge lid of the mobile communication device of FIG. 5A.

FIGS. 5A to 5C are side, end, and bottom views of the hinge lid 156 respectively. The hinge lid 156 generally includes an upper section 196 and a lower section 198. The upper section 196 includes an upper hinge lid surface 200 which is substantially flat (shown in FIGS. 5A and 5B), a back hinge lid surface 202 which is convexly curved (shown in FIGS. 5A, 5B and 5C), a front hinge lid surface 204 which is convexly curved (shown in FIGS. 5A and 5C) and a lower hinge lid surface 206 which is substantially flat (shown in FIGS. 5A and 5B). The hinge lid 156 also includes an outer hinge lid surface 214 and an inner hinge lid surface 216 (shown in FIGS. 5B and 5C). A first hinge lid pivot hole 218 (shown in FIG. 5A) is defined in the upper section 196 toward back hinge lid surface 202. The upper section 196 of the hinge lid 156 also includes a hinge lid recess 212 (shown in FIGS. 5A and 5C) defined in the inner hinge lid surface 216 toward the back hinge lid surface 202. A hinge lid spring pin 210 is provided in the hinge lid recess 212. The hinge lid recess 212 extends to the lower hinge lid surface 206.

The lower section 198 is a substantially flat wall that depends perpendicularly and downward from the lower hinge lid surface 206 and extends from the front hinge lid surface 204 partially toward the back hinge lid surface 202 of the upper section 196. As seen in FIGS. 5B and 5C, the lower section 198 is narrower than the upper section 196. The lower section 198 defines a second hinge lid pivot hole 220 (shown in FIG. 5A) generally below the front hinge lid surface 204.

FIGS. 6A and 6B are perspective and end views of the hinge base 158. The hinge base 158 has a hinge base front end 224 and a hinge base back end 222 (shown in FIG. 6A), an inner hinge base surface 226 and an outer hinge base surface 228. The hinge base 158 includes a hinge lid clearance surface 232, which is concavely curved, an inner wall section 234, and an outer wall section 236. The inner and outer wall sections 234 and 236 have an inner upper wall surface 238 and an outer upper wall surface 240 respectively, which are substantially flat. The hinge lid clearance surface 232, inner upper wall surface 238 and the outer upper wall surface 240 are together shaped complimentary to the convexly curved back hinge lid surface 202 and the lower hinge lid surface 206 in order to receive the hinge lid upper section 196. A slot 242 is defined between inner and outer wall sections 234 and 236 for receiving the lower section 198 of the hinge lid 156 (shown in FIGS. 5A to 5C). A lower slot surface 243, which is substantially flat and parallel to the inner upper wall surface 238 and outer upper wall surface 240, defines the bottom of the slot 242. A clearance groove 244 (shown in FIG. 6A) is defined in the inner hinge base surface 226 of the hinge base 158. First and second hinge base pivot holes 246 and 248 are aligned with each other in respective inner wall section 234 and outer wall section 236 near the hinge base front end 224. A third hinge base pivot hole 250 (shown in FIG. 6A) is toward the hinge base back end 222. A hinge base rotation control pin 252 depends inward from the inner hinge base surface 226 below the slot 242.

Figure 7:
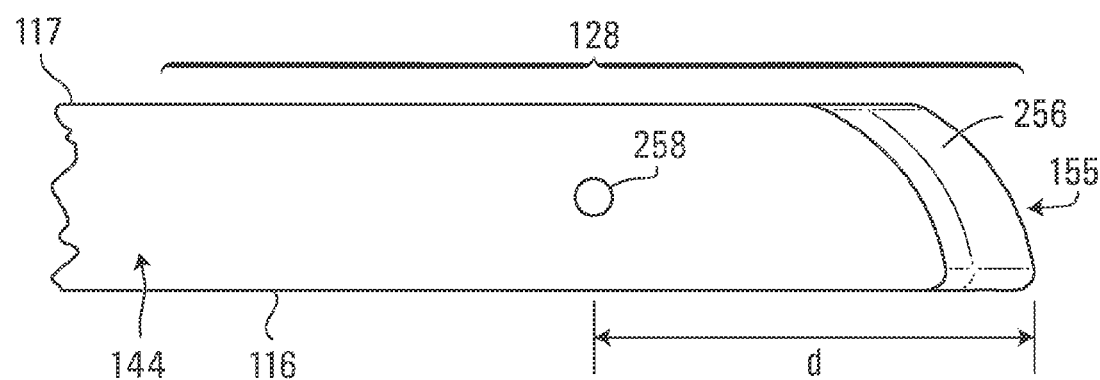
FIG. 7 is a partial side view of a lid member body of the mobile communication device of FIG. 2A.

FIG. 7 is an enlarged partial side view of the lid member body 144. FIG. 7 shows the outer lid member surface 117, the inner lid member surface 116, and the second lid member body end 155. The second lid member body end 155 of the lid member body 144 includes a cam radii surface 256. A lid member pivot hole 258 is disposed a distance "d" away from the second lid member body end 155. FIG. 7 also shows the overlap portion 128 of the lid member body 144. As can be seen, the distance "d" is approximately half as long as the overlap portion 128. The length of the overlap portion may be defined by the distance "d".

Figure 8A:
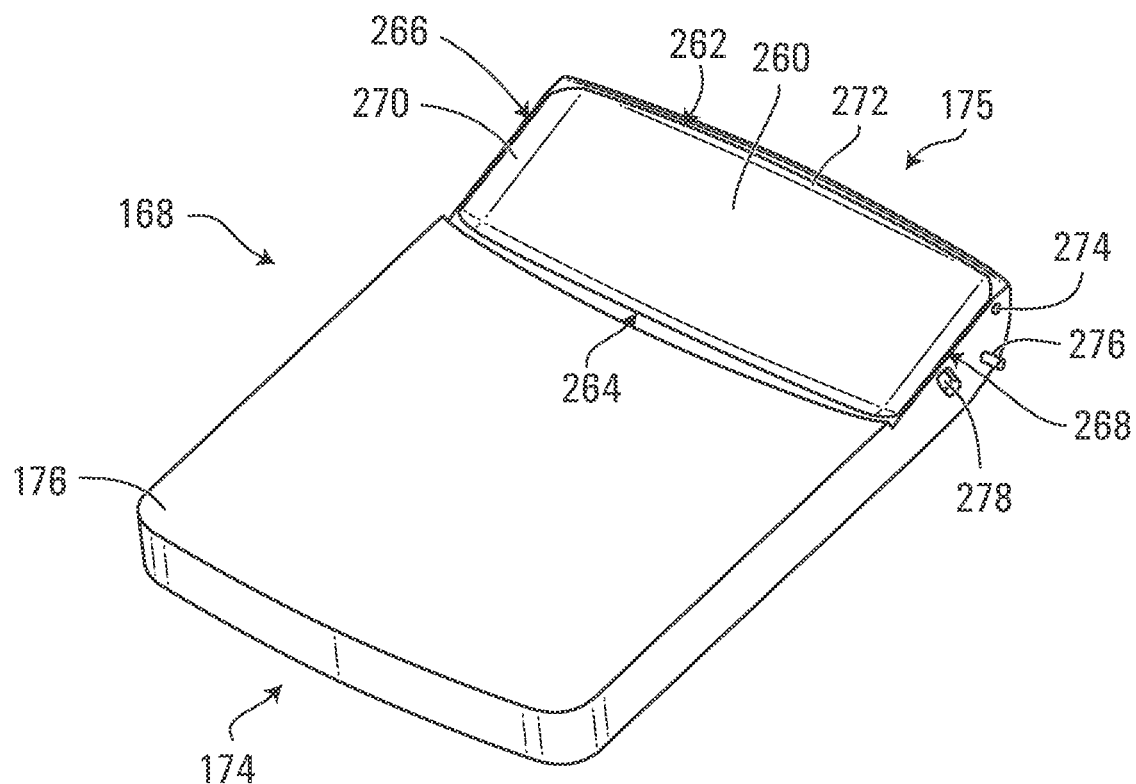
FIG. 8A is a perspective view of a base member body of the mobile communication device of FIG. 2A.
Figure 8B:
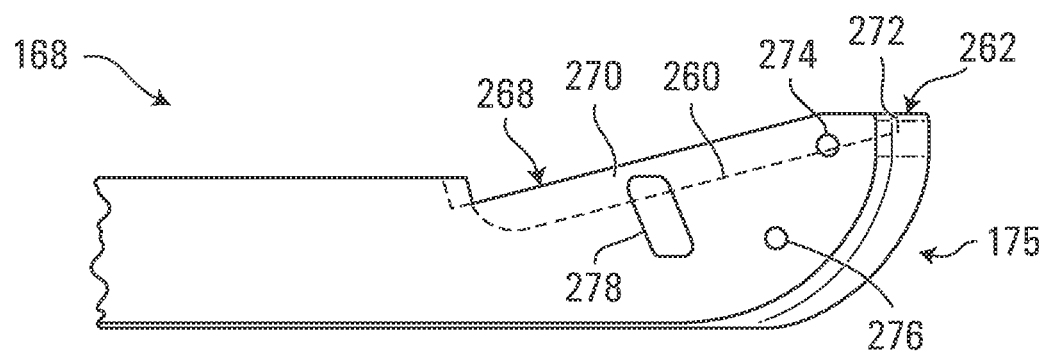
FIG. 8B is a partial side view of the base member body of the mobile communication device of FIG. 8A.

FIGS. 8A and 8B are a perspective and an enlarged partial side view of the base member body 168 respectively. The base member body 168 includes an angled cam surface 260 which is angled with respect to the inner base member body surface 176 (shown in FIG. 8A). Specifically, the cam surface 260 is angled upward with respect to the inner base member body surface 176 moving in the backward direction. The angled cam surface 260 has a back 262, a raised front 264, a first raised side 266 and a second raised side 268 (all shown in FIG. 8A). A concavely curved lip 270 (shown in FIG. 8A) extends along the raised front 264 and the first and second raised sides 266 and 268 of the angled cam surface 260. The back 262 of angled cam surface 260 includes a raised step-type lip 272. It is to be understood that embodiments are not limited to those comprising cam surfaces. Furthermore, cam surfaces may not be angled in some embodiments. For example, a user of the device could apply a force to drive the translational movement of a lid member in some embodiments. In other embodiments, elements of the hinge mechanism may drive the translational movement of a lid member.

The base member body 168 includes a base member pivot hole 274 toward the second base member body end 175 and a hinge base spring pin 276 located lower than the base member pivot hole 274 and further forward than the second base member body end 175. Located even further forward than the second base member body end 175 is a hinge rotation control guide 278 which is designed to receive hinge base rotation control pin 252 (shown in FIGS. 6A and 6B) with room for restricted travel of the hinge base rotation control pin 252. The hinge rotation control guide 278 may be a slot or other mechanism to receive and restrict movement of the hinge base rotation control pin 252.

It is to be understood that embodiments implementing multi-pivot linkage mechanisms are not limited to those having a hinge lid 156, hinge base 158, or lid and base members 110 and 112 as described above. More or less hinge elements may be implemented in some embodiments. The shape and features of similar elements in some other embodiments may be implementation specific. For example, a linkage mechanism could comprise simple bar links, rather than the hinge lid and base 156 and 158 described above. A linkage mechanism could also comprise more or fewer elements than those of the linkage mechanism 114 described herein.

Figure 9A:
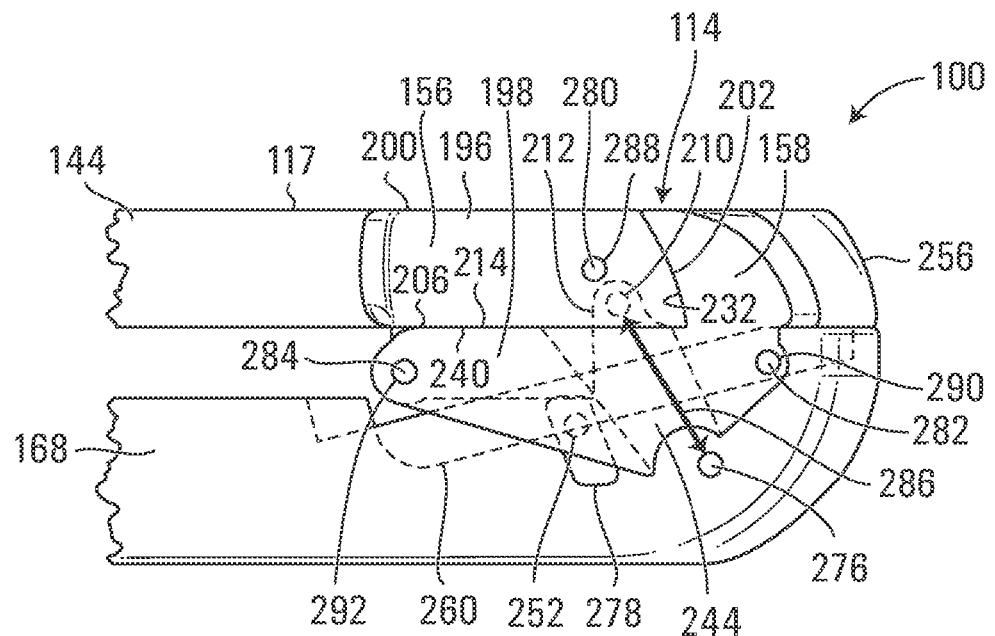
FIG. 9A is a partial side view of the mobile communication device of FIG. 2A without trims or covers in the closed position.
Figure 9B:
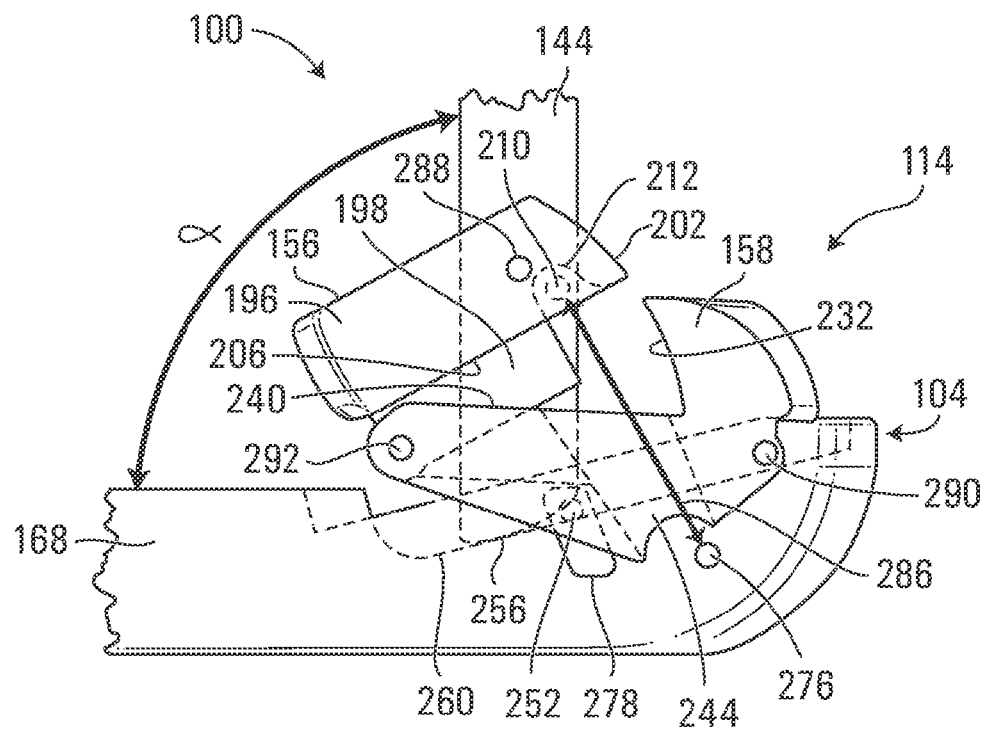
FIG. 9B is a partial side view of the mobile communication device of FIG. 2A without trims or covers in a partially opened position.
Figure 9C:
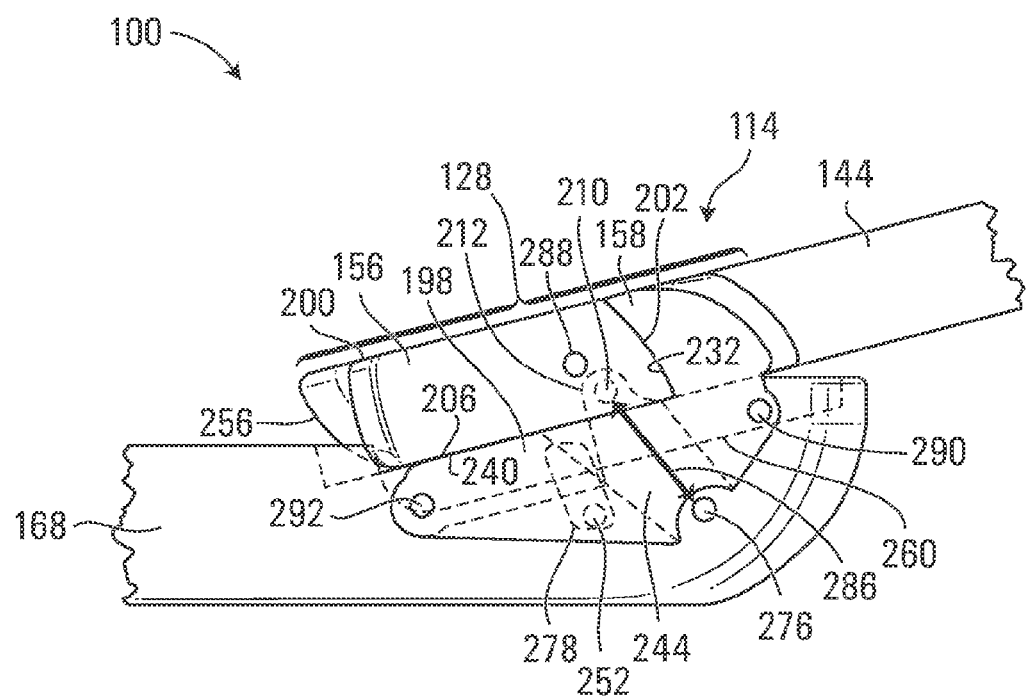
FIG. 9C is a partial side view of the mobile communication device of FIG. 2A without trims or covers in the fully opened position.

FIGS. 9A to 9C are each enlarged partial side views of the device 100 which show the device in the closed position, a partially opened position between the closed and fully opened positions, and the fully opened position respectively. The lid trim 142, the lid external cover 140, the base cover 164, the base trim top 162, the base trim bottom 166, and the base inlay 160 (all shown in FIG. 3) are not shown in FIGS. 9A to 9C so that the linkage mechanism 114, the lid member body 144 and the base member body 168 are visible. It is to be understood that the lid trim 142 and the lid external cover 140 (both shown in FIG. 3) move coincidentally with the lid member body 144, and that the base cover 164, the base trim top 162, the base trim bottom 166, and the base inlay 160 (all shown in FIG. 3) move coincidentally with the base member body 168. Therefore, the movement and/or positions of the lid member body 144 and the base member body 168, as described with reference to FIGS. 9A to 9C is equivalent to movement and/or positions of the lid member 110 and the base member 112 respectively (both shown in FIG. 2A)

Turning to FIG. 9A, first, second and third pivot pins 280, 282, and 284 are defined in the linkage mechanism 114 of the device 100 and are received in respective pivot holes. The specific arrangement of the first, second and third pivot pins 280, 282, and 284 will be discussed below.

In some embodiments, an extension spring or other bias element may be utilized to provide a bias force to bias the device to remain in either the opened position or the closed position. In the embodiment shown in FIGS. 2A to 10C, an extension spring represented by arrow 286 is utilized as a bias element to provide this force. The extension spring 286 is biased against stretching or lengthening.

The arrangement and interaction of the elements of device 100 shown in FIGS. 2A to 8B will now be described in more detail with reference to FIGS. 9A to 9C.

The hinge lid 156 and the lid member body 144 are rotatably coupled by means of the first pivot pin 280 (shown in FIG. 9A) which is received in the lid member pivot hole 258 (shown in FIG. 7) and first hinge lid pivot hole 218 (shown in FIG. 5A). In some embodiments, the first pivot pin 280 may be integral to the hinge lid 156 or the lid member body 144. The lid member pivot hole 258, the first hinge lid pivot hole 218 and the first pivot pin 280 are hereinafter collectively referred to as a lid pivot 288.

The hinge base 158 and the base member body 168 are rotatably coupled by means of the second pivot pin 282 (shown in FIG. 9A) which is received in the third hinge base pivot hole 250 (shown in FIG. 6A) and the base member pivot hole 274 (shown in FIGS. 8A and 8B). In some embodiments, the second pivot pin 282 may be integral to the hinge base 158 or the base member body 168. The third hinge base pivot hole 250, the base member pivot hole 274 and the second pivot pin 282 are hereinafter collectively referred to as a base pivot 290.

The hinge lid 156 and the hinge base 158 are rotatably coupled by means of the third pivot pin 284 (shown in FIG. 9A) which is received in the second hinge lid pivot hole 220 (shown in FIG. 5A) and the first and second hinge base pivot holes 246 and 248 (shown in FIG. 6A). In some embodiments, the third pivot pin 284 may be integral to the hinge base 158 or the hinge lid 156. The second hinge lid pivot hole 220, the first hinge base pivot hole 246, the second hinge base pivot hole 248 and the third pivot pin 284 are hereinafter collectively referred to as a hinge pivot 292.

Thus, there are three pivots in the linkage mechanism 114: the lid pivot 288; the base pivot 290; and the hinge pivot 292. When the device 100 is in either the opened position or the closed position, the total combined distance between the lid pivot 288 and the hinge pivot 292 and between the base pivot 290 and the hinge pivot 292 is greater than the distance between the lid pivot 288 and the base pivot 290. This relationship allows the lid pivot 288 and the base pivot 290 to move apart as the device is opened. The lid pivot 288 may also be referred to as a first pivot. The hinge pivot 292 may also be referred to a second pivot. The base pivot 290 may also be referred to as a third pivot. The extension spring 286 is attached to a base spring pin 276 (shown in FIG. 8A) of the base member body 168 and to hinge lid spring pin 210 (shown in FIGS. 5A and 5C) of the lid member body 144. Groove 244 (shown in FIG. 6A) of the hinge base 158 and hinge lid recess 212 (shown in FIGS. 5A and 5C) provide clearance for the extension spring 286. In addition, the hinge base rotation control guide 278 receives the hinge base rotation control pin 252 of the hinge base 158. Embodiments are not limited to those implementing a spring or rotation control guide 278 and hinge base rotation control pin 252 as described above.

The linkage mechanism 114, as described above, is an expandable multi-pivot hinge that can expand in the upward direction to allow displacement of lid pivot 288, which in turn allows translational movement of the lid member body 144. The expansion of the linkage mechanism 114 is allowed by the rotation of the hinge lid 156 and the hinge base 158. The hinge base 158 may rotate about the base pivot 290 and is free to rotate in both directions. The hinge lid 156 may rotate about the hinge pivot 292 and is free to rotate in a counter-clockwise direction from the closed position (shown in FIG. 9A).

In this embodiment, starting from the closed position of the device 100 shown in FIG. 9A, the lower section 198 of the hinge lid 156 is received in the corresponding slot 242 in the hinge base 158. There is a slight clearance between the lower hinge lid surface 206 and the inner upper wall surface 238 (shown in FIG. 6A) and outer upper wall surface 240, such that the lower hinge lid surface 206 is essentially adjacent to the inner upper wall surface 238 and the outer upper wall surface 240. The hinge lid clearance surface 232 of the hinge base 158 is essentially adjacent to and aligned with the back hinge lid surface 202. The upper hinge lid surface 200 is aligned with, and forms part of, the outer lid member surface 117. In the closed position, the separation between the inner lid member surface 116 and the inner base member body surface 176 provides space for the base cover 164 (shown in FIG. 3).

As the device 100 is moved from the closed position shown in FIG. 9A to the partially opened position shown in FIG. 9B, lid member body 144 rotates with respect to the base member body 168 (clockwise in FIGS. 9A to 9C). As the lid member rotates, the linkage mechanism 114 expands in the upward direction. Specifically, as the lid member body 144 is rotated clockwise about the lid pivot 288, cam radii surface 256 of the lid member body 144 slides forward along the angled cam surface 260 of the base member body 168. The interaction of the angled cam surface 260 of the lid member body 144 and the cam radii surface 256 of the base member body 168 drives the translational movement of the lid member body 144. Specifically, the sliding contact between the angled cam surface 260 of the base member body 168 and the cam radii surface 256 of the lid member body 144 levers the lid member body 144 upward. The distance between the lid pivot 288 and the cam radii surface 256 is greater than the distance between the lid pivot 288 and the angled cam surface 260 when the device is in the closed position (as shown in FIG. 9A). Therefore, as the cam radii surface 256 slides along angled cam surface 260, to a position approximately under the lid pivot 288, as shown in FIG. 9B, the lid pivot 288 becomes upwardly displaced from the base member body 168. As the lid pivot 288 is driven upward, the hinge base 158 rotates clockwise and the hinge lid 156 rotates counter-clockwise to allow the upward movement of the lid pivot 288.

Embodiments are not limited to those in which an angled cam surface is implemented to drive translational movement of a lid member. For example, as long as the linkage mechanism allows translational movement, a user of the device could actuate the translational movement themselves. Alternatively, the linkage mechanism can be designed to actuate the translational movement.

The hinge base rotation control pin 252 interacts with the hinge rotation control guide 278 of the base member body 168 to restrict the angular rotation of the hinge base 158 in both directions to prevent hyper-extension. Specifically, the hinge rotation control guide 278 of the base member body 168 prevents hyper-extension of the hinge base 158 in the upward direction. The bottom of the hinge rotation control guide 278 controls the downward movement of the hinge mechanism 114 and helps to align the upper hinge lid surface 200 with the inner lid member surface 116 in the open position.

Turning now to FIG. 9B, which shows the device 100 in the partially opened position, the lid member body 144 has been rotated to an angle alpha with respect to the base member body 168. The partially opened position of the device 100 shown in FIG. 9B is approximately the point of movement between the opened and closed positions where the lid member body 144 is maximally displaced from the base member body 168. The lower hinge lid surface 206 has moved away from the inner upper wall surface 238 (shown in FIG. 6A) and outer upper wall surface 240. The back hinge lid surface 202 also moves away from the hinge lid clearance surface 232 of the hinge base 158.

As the device continues to move from the partially opened position shown in FIG. 9B to the fully opened position shown in FIG. 9C, the cam radii surface 256 continues to slide forward along the angled cam surface 260. The lid pivot 288 moves back downward and the linkage mechanism 114 contracts. Specifically, the hinge lid 156 rotates clockwise and the hinge base 158 rotates counter clockwise.

Turning to FIG. 9C, the device 100 is shown in the fully opened position. When the lid member body 144 has rotated to the fully opened position, the overlap portion 128 of the lid member body 144 rests against the first and second raised sides 266 and 268 (shown in FIG. 8A) of the angled cam surface 260 and the lid external cover 140 (shown in FIG. 3) rests against the base cover recesses 188 (shown in FIG. 3). The linkage mechanism 114 is no longer expanded and the hinge lid 156 and the hinge base 158 again fit together. Specifically, the lower hinge lid surface 206 is again adjacent to the inner upper wall surface 238 (shown in FIG. 6A) and outer upper wall surface 240. The back hinge lid surface 202 is also again adjacent to the hinge lid clearance surface 232 of the hinge base 158. With the device 100 in the fully opened position, the hinge lid and base 156 and 158 are each rotated (counter clockwise) with respect to the closed position (shown in FIG. 9A) such that upper hinge lid surface 200 is aligned with, and forms part of, the inner lid member surface 116 (shown in FIG. 2B). The overlap portion 128 of the lid member 110 overlaps the base member 112.

The extension spring 286 is stretched in the closed and open positions to provide a location force. During translation of the lid pivot 288 the extension spring 286 is stretched further with the cam radii surface 256 / angled cam surface 260 interaction providing an over-center bias. It is to be understood that the extension spring 286 may be omitted in some embodiments or replaced with another biasing means such as magnets arranged to provide a biasing force.

As will be appreciated by a person skilled in the art, movement of the device 100 from the fully opened position shown in FIG. 9C to the closed position shown in FIG. 9A will essentially reverse the movements of elements of the device 100 as described above.

Figure 10A:
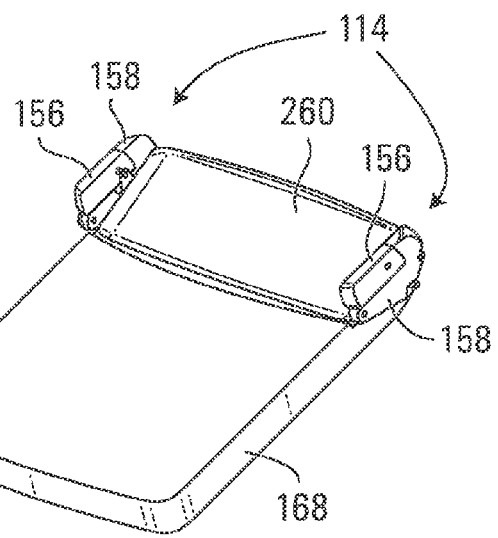
FIG. 10A is a perspective view of the base body member and a linkage mechanism of the mobile communication device of FIG. 2A in the closed position.
Figure 10B:
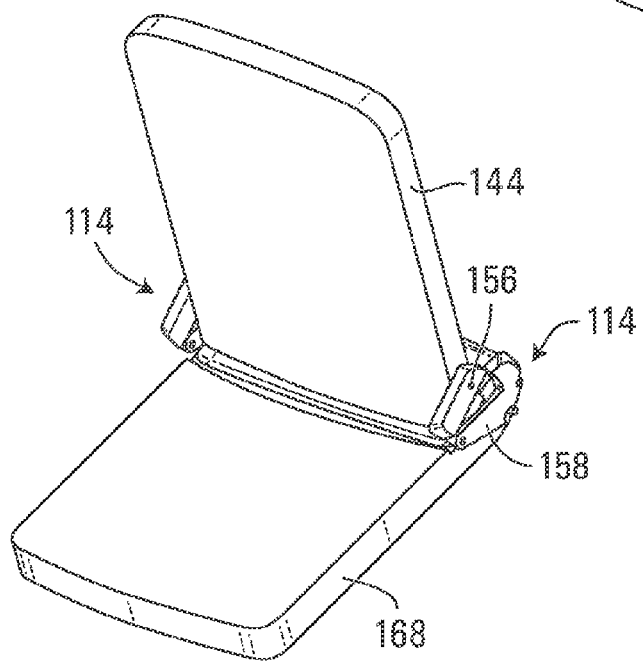
FIG. 10B is a perspective view of the mobile communication device of FIG. 2A without trims or covers in the partially opened position.
Figure 10C:
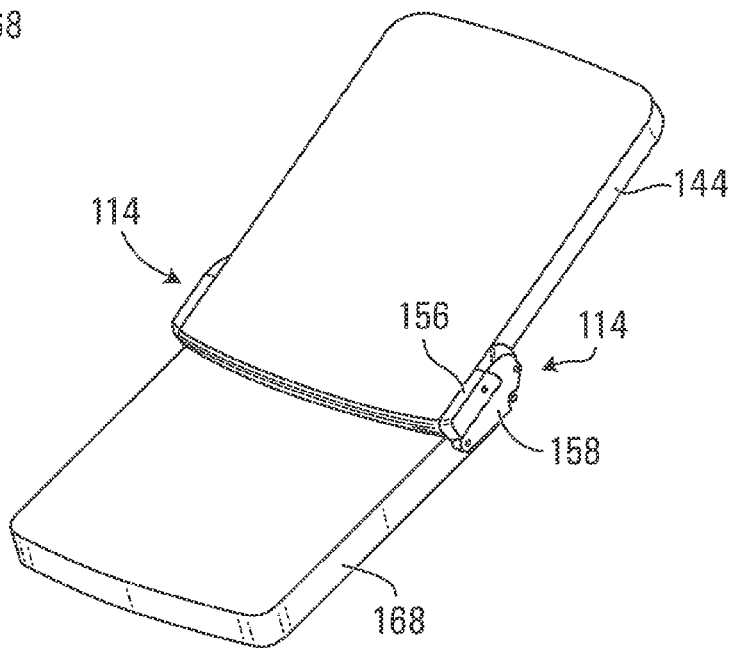
FIG. 10C is a perspective view of the mobile communication device of FIG. 2A without trims or covers in the fully opened position.

FIGS. 10A to 10C are perspective views of elements of the device 100 in the closed, partially opened, and fully opened positions respectively. FIG. 10A shows the base member body 168 and the linkage mechanism 114 of the device 100 in their respective orientations when the device 100 is in the closed position as described with reference to FIG. 9A. FIGS. 10B and 10C show the lid member body 144, the base member body 168 and the linkage mechanism 114 of the device 100 in their respective orientations when the device 100 is in the partially opened and fully opened positions as described with reference to FIGS. 9B and 9C respectively.

Embodiments implementing a multi-pivot linkage device are not limited to the specific pivot positions and rotation directions described above. As will be appreciated by one skilled in the art, other pivot arrangements may also be implemented to allow translational movement of a lid member. For example, more or less hinge elements may be implemented, and hinges could implement hinges that slidably extend link lengths to expand the hinge.

Another example of an embodiment of a flip phone device implementing a multi-pivot linkage mechanism will now be described with reference to FIGS. 11 to 17C. The embodiment shown in FIGS. 11 to 17C has similar closed, partially opened, and fully opened positions as those described above and implements a linkage mechanism that functions similarly to the linkage mechanism of the previous embodiment (shown in FIGS. 2A to 10C).

FIG. 11 is a partially exploded perspective view of a flip phone device 300 in a fully opened position. The device 300 has a free end 302, a linked end 304, a first device side 306 and an opposite second device side 308. The device 300 includes a first or lid member 310, a second or base member 312, and a linkage mechanism 314. The linkage mechanism 314 is an expandable multi-pivot hinge similar to the linkage mechanism 114 described above and shown in FIGS. 9A to 9C. The device 300 has both closed and opened positions similar to those of the device 100 shown in FIGS. 2A and 2B.

The linkage mechanism 314 is disposed near the linked end 304 and includes elements which are mirrored at both the first and second device sides 306 and 308. In some embodiments, however, elements of the linkage mechanism may only be disposed by one of the first or second device side 306 or 308.

Figure 16A:
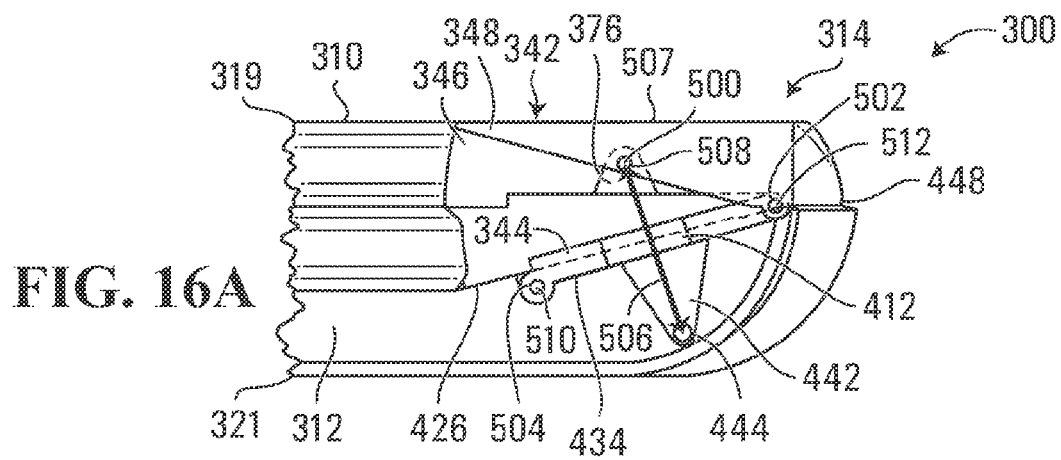
FIG. 16A is a partial side view of the mobile communication device of FIG. 11, without trims or covers in the closed position.

The lid member 310 has an inner lid member surface 318 and an opposite outer lid member surface 319 (shown in FIG. 16A). The base member 312 has an inner base member surface 320 and an opposite outer base member surface 321 (shown in FIG. 16A). In this embodiment, the lid member 310 includes a graphical display 322 on the inner lid member surface 318. The base member 312 includes a keyboard 323 on the inner base member surface 320. Lid member 310 has a first lid member end 324, a second lid member end 326, a first lid member side 328 and an opposite second lid member side 330. Base member 312 has a first base member end 332, an opposite second base member end 334, a first base member side 336 and an opposite second base member side 338. The lid member 310 has an overlap portion 340 which overlaps the base member 312 at the linked end 304 of the device 300 when the device is in the fully opened position.

Only the elements of the linkage mechanism 314 at the first device side 308 are shown in the exploded view. Again, embodiments are not limited to those comprising a linkage mechanism with elements mirrored at sides of a device.

In the remaining discussion of the device 300, the direction extending perpendicularly away from the base member 312 and toward the lid member 310, when the device 300 is in the closed position, will be referred to as the upward direction. Conversely, the opposite direction will be referred to as the downward direction. The direction extending away from the linked end 304 toward the free end 302 of the device 300, when the device 300 is in the closed position, will be referred to as the forward direction. Conversely, the opposite direction will be referred to as the backward direction. The upward, downward, forward and backward directions are referenced to the base member 312 which is shown as remaining stationary relative to other elements of the device 300 in the figures. These reference directions are for ease of description and do not require any particular orientation of the elements of the device 300 including the base member 312.

For simplicity and clarity, only the elements of the linkage mechanism 314 on the second device side 308 of the device 300 (shown in FIG. 11) will be described although it is to be understood that these elements are mirrored on the first device side 306.

In the embodiment shown in FIG. 11, the linkage mechanism 314 includes a first hinge piece or hinge lid 342 and a second hinge piece or hinge base 344. The hinge lid 342 includes an inner hinge lid piece 346 and an outer hinge lid piece 348.

Figure 12:
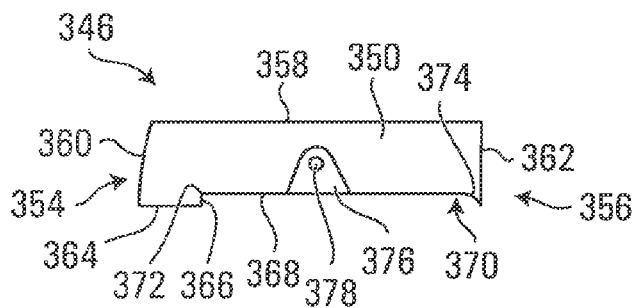
FIG. 12 is a side view of an inner hinge lid piece of the mobile communication device of FIG. 11.

FIG. 12 is a side view of the inner hinge lid piece 346. The inner hinge lid piece 346 has an outer surface 350 and an inner surface (not shown). The inner hinge lid piece 346 has a front end 354 and a back end 356. The inner hinge lid piece 346 also has an upper surface 358 as well as a first side surface 360 and a second side surface 362 at the respective front and back ends 354 and 356 of the inner hinge lid piece 346. The inner hinge lid piece 346 further includes a first lower surface 364, a second lower surface 366 and a third lower surface 368. The first, second, and third lower surfaces 364, 366 and 368 of the inner hinge lid piece 346 together define a long lower groove 370 which extends from the back end 356 of the of the inner hinge lid piece 346 to the first lower surface 364 of the inner hinge lid piece 346. The lower groove 370 has a square groove corner 372 formed by the second and third lower surfaces 366 and 368 of the inner hinge lid piece 346 toward the front end 354 of the inner hinge lid piece 346. The lower groove 370 also has a concavely curved groove corner 374 near the back end 356. The inner hinge lid piece 346 further defines a hinge lid spring clearance groove 376 in the outer surface 350 of the inner hinge lid piece 346 which extends to the third lower surface 368. A first hinge lid pivot hole 378 is located in the hinge lid spring clearance groove 376.

Figure 13:
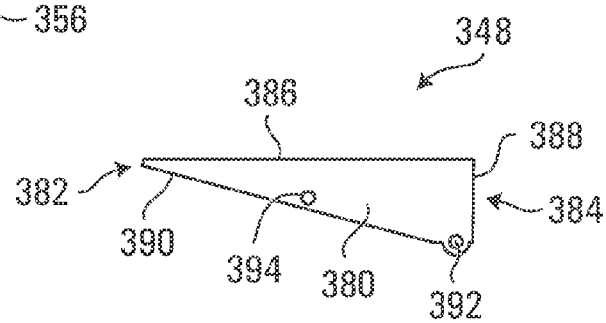
FIG. 13 is a side view of an outer hinge lid piece of the mobile communication device of FIG. 11.

FIG. 13 is a side view of the outer hinge lid piece 348 (shown in FIG. 11). The outer hinge lid piece 348 has an outer surface 380, an inner surface (not shown), a front end 382 and a back end 384. The outer hinge lid piece 348 is generally triangular shaped with an upper surface 386, a side surface 388 and a generally diagonal surface 390 which are all substantially flat. The upper surface 386 of the outer hinge lid piece 348 is approximately the same length as the upper surface 358 of the inner hinge lid piece 346 (shown in FIG. 12). A second hinge lid pivot hole 392 is located near the intersection of the diagonal surface 390 and the side surface 388. A third hinge lid pivot hole 394 is located approximately half way between ends 382 and 384 of the outer hinge lid piece 348.

Figure 14:
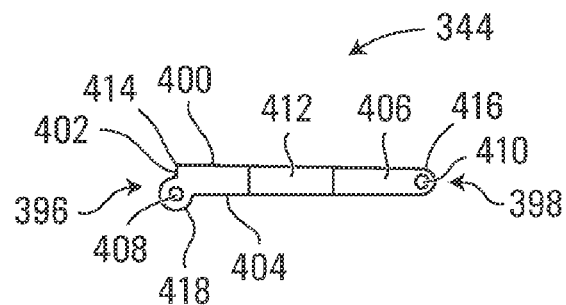
FIG. 14 is a side view of a hinge base of the mobile communication device of FIG. 11.

FIG. 14 is a side view of the hinge base 344 (shown in FIG. 11). The hinge base 344 is an elongated member with a front end 396 and a back end 398. The hinge base 344 has an upper surface 400, a side surface 402, a lower surface 404, an outer surface 406 and an inner surface (not shown). First and second hinge base pivot holes 408 and 410 are disposed near the respective front and back ends 396 and 398 of the hinge base 344. The hinge base 344 includes a hinge base spring clearance groove 412 in its outer surface 406. The upper and side surfaces 400 and 402 of the hinge base 344 are shaped complimentary to the lower surfaces 368 and 366 of the inner hinge lid piece 346 (shown in FIG. 12). Specifically, the upper and side surfaces 400 and 402 of the hinge base 344 meet together at a squared corner 414, and the lower surface 404 and the upper surface 400 of the hinge base 344 meet at convexly curved corner 416 at the back end 398 of the hinge base 344. A curved portion 418 of the lower edge 404 of the hinge base 344 extends around the first hinge base pivot hole 408.

Figure 15:
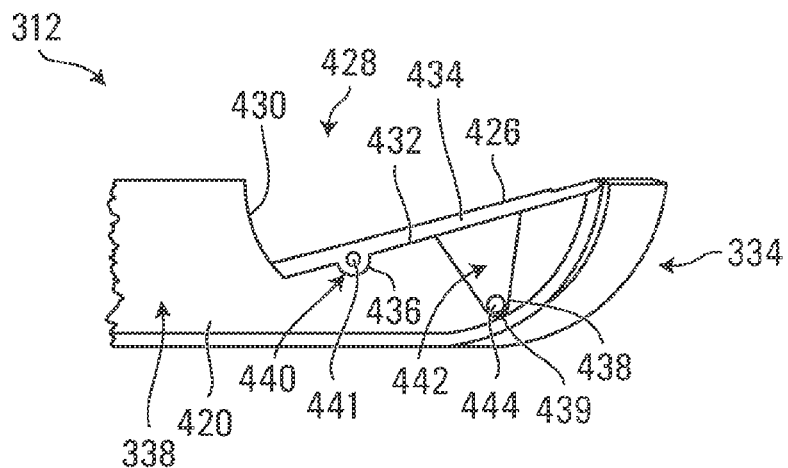
FIG. 15 is a partial side view of a base member of the mobile communication device of FIG. 11.

FIG. 15 is an enlarged partial side view of the base member 312 (shown in FIG. 11). The base member 312 includes an angled cam surface 426 which, starting from the second base member end 334 of the base member 312 and moving forward, angles downward creating a base member recess 428. The recess is partially bounded by a first base member recess surface 430 which is substantially perpendicular to the angled cam surface 426. The base member 312 includes a second base member recess surface 432 which is recessed into each of the first and second base member sides 336 and 338 (shown in FIG. 11) to provide clearance for the hinge lid 342 and the hinge base 344 (both shown in FIG. 11). The first base member recess surface 430 is shaped complimentary to the first side surface 360 of the inner hinge lid piece 346 (shown in FIG. 12). A hinge clearance surface 434 extends from angled cam surface 426 to the second base member recessed surface 432. The second base member recess surface 432 includes straight portions generally parallel to the angled cam surface 426 as well as a curved edge portion 436 and a V-shaped edge portion 438 with a rounded point 439. The curved edge portion 436 defines a surface recess 440, and the V-shaped edge portion 438 defines a base member spring clearance groove 442. The surface recess 440 is concavely curved and is shaped complimentary to the curved portion 418 of the hinge base 344. A base member pivot hole 441 is disposed in recess 440. A base member spring pin 444 depends outward from base member spring clearance groove 442 near the rounded point 439.

Turning back to FIG. 11, the lid member 310 has a lid member recess 446 on the second lid member side 330 and the first lid member side (not shown) toward the second lid member end 326 for receiving and providing clearance for elements of the hinge mechanism 314. Specifically, the lid member 310 includes a recessed side wall 452 which is parallel to the second lid member side 330 of the lid member 310, but is set inward approximately the thickness of the hinge lid 342 and the hinge base 344. The lid member recess 446 is defined by lid member recess surface 454 of the lid member and extends fully to the second lid member end 326 of the lid member 310. The distance between the lid member recess surface 454 and the second lid member end 326 is approximately equal to the length of the hinge lid 342. A lid member pivot hole 450 is located approximately in the middle of the recessed wall 452. The lid member includes cam radii surface 448 at the second lid member end 326 (described below and shown in FIGS. 16A to 16C).

In this embodiment, the device 300 further includes trims and covers on the first and second device sides 306 and 308. Specifically, the device 300 includes a base cosmetic cover 456, a mechanism cosmetic trim 458, a lid cosmetic trim 460, and a base cosmetic trim 462. The base cosmetic cover 456 includes upper surface 464 and lower surface 466 which are shaped similarly to the side surface 420 of the base member 312. The base cosmetic cover 456 completes the external form of the base member 312.

The lid and base cosmetic trims 460 and 462 each have a respective first end 470 and 472 and second end 474 and 476. The lid and base cosmetic trims 460 and 462 also have respective upper surfaces 478 and 480 and opposite respective lower surfaces 482 and 484 along their length, all of which follow the form of the base and lid members. The lid and base cosmetic trims 460 and 462 also have respective outer surfaces 486 and 488.

The mechanism cosmetic trim 458 has an upper surface 490, a lower surface 492 and opposite side surfaces 494 and 496. The mechanism cosmetic trim also has an outer surface 498 and an opposite inner surface (not shown). The upper surface 490 is substantially flat and is the same length as the upper surfaces 358 and 386 of the hinge lid inner and outer pieces 346 and 348 (shown in FIGS. 12 and 13 respectively).

Embodiments are not limited to those having cosmetic covers or trims. For example, a linkage mechanism may be visible and accessible and may omit trims or covers.

Figure 16B:
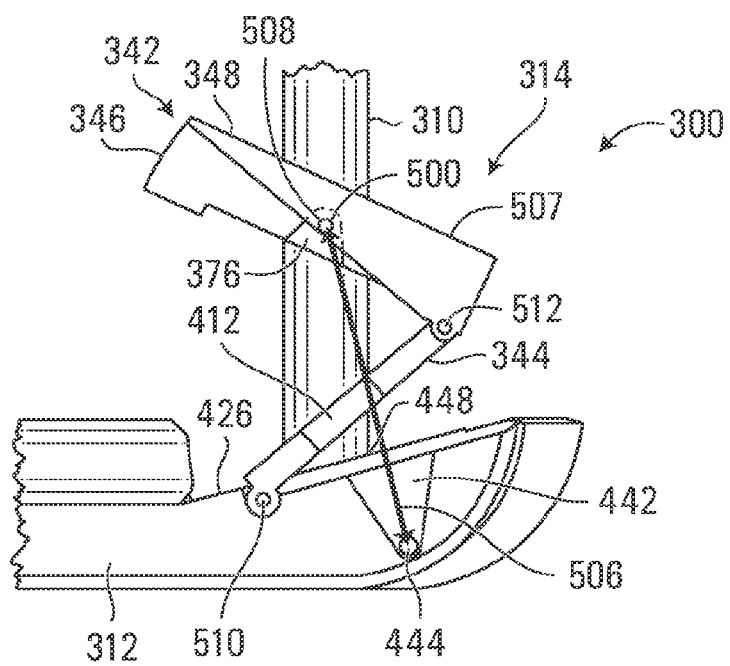
FIG. 16B is a partial side view of the mobile communication device of FIG. 11, without trims or covers in the partially opened position.
Figure 16C:
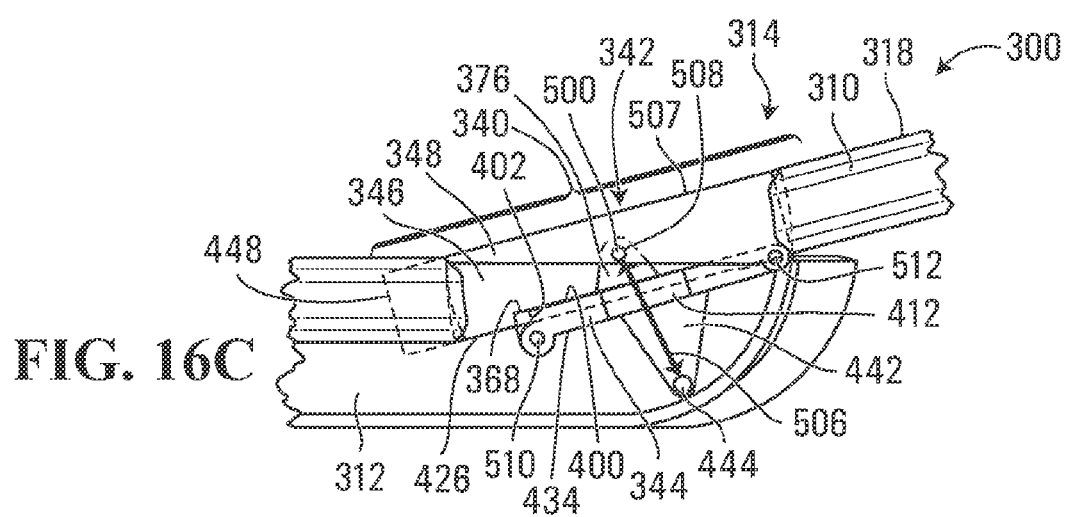
FIG. 16C is a partial side view of the mobile communication device of FIG. 11, without trims or covers in the fully opened position.

FIGS. 16A to 16C are each enlarged partial side views of the device 300, without the mechanism, lid and base cosmetic trims 458, 460, 462 and the base cosmetic cover 456 so that the linkage mechanism 314 is visible. FIGS. 16A to 16C show the device 300 in a closed position, a partially opened position between the closed and opened positions, and the fully opened positions respectively.

Turning to FIG. 16A, first, second, and third pivot pins 500, 502 and 504 are defined in the linkage mechanism 314 of the device 300 and are received in respective pivot holes. The specific arrangement of the pivot pins will be discussed below.

In this embodiment, an extension spring 506 is utilized as a bias element to provide a bias force biasing the device 300 to remain in either the opened position or the closed position.

The arrangement and interaction of the elements of device 300 shown in FIG. 11 will now be described with reference to FIGS. 16A to 17C.

With reference to FIGS. 16A to 16C, the outer surface 350 of the inner hinge lid piece 346 (shown in FIG. 12) and the inner surface of the outer hinge lid pieces 348 (shown in FIGS. 12 and 13) are fixedly connected to act as a single element such that their respective upper surfaces 358 and 386 are aligned and the first and third hinge lid pivot holes 378 and 394 (shown in FIGS. 12 and 13 respectively) are aligned. The combined upper surfaces 358 and 386 are hereinafter collectively referred to as upper surface 507 of the hinge lid 342 (shown in FIGS. 16A to 16C). One skilled in the art will appreciate that the inner and outer hinge pieces 346 and 348 could be fixedly connected in any number of known ways without departing from the embodiment.

The hinge lid spring clearance groove 376, the hinge base spring clearance groove 412 and the base member spring clearance groove 442 are defined in the hinge lid 342, the hinge base 344 and the base member 312 respectively to provide clearance for the extension spring 506.

The hinge lid 342 and the lid member 310 are rotatably coupled by means of the first pivot pin 500 (shown in FIG. 16A) which is received in the lid member pivot hole 450 (shown in FIG. 11), and the first and third hinge lid pivot holes 378 and 394 (shown in FIGS. 12 and 13 respectively). The lid member pivot hole 450, the first and third hinge lid pivot holes 378 and 394 and the respective first pivot pin 500 are hereinafter collectively referred to as a lid pivot 508.

The hinge base 344 and the base member 312 are rotatably coupled by means of the third pivot pin 504 (shown in FIG. 16A) which is received in the respective first hinge base pivot hole 408 of the hinge base 344 (shown in FIG. 14) and the base member pivot hole 441 (shown in FIGS. 15). The first hinge base pivot hole 408 and the base member pivot hole 441 and the respective third pivot pin 504 are hereinafter collectively referred to as a base pivot 510.

The hinge lid 342 and the hinge base 344 are rotatably coupled by means of the second pivot pin 502 (shown in FIG. 16A) received in the second hinge lid pivot hole 392 of the outer hinge lid piece 348 (shown in FIG. 13) and the second hinge base pivot hole 410 (shown in FIGS. 14). The second hinge lid pivot hole 392, the second hinge base pivot hole 410 and the second pivot pin 502 are hereinafter collectively referred to as a hinge pivot 512.

Thus, there are three pivots in the hinge mechanism 314: the lid pivot 508; the base pivot 510; and the hinge pivot 512. When the device 300 is in either the opened position or the closed position, the total combined distance between the lid pivot 508 and the hinge pivot 512 and between the hinge pivot 512 and the base pivot 510 is greater than the distance between the lid pivot 508 and the base pivot 510. This relationship allows the lid pivot 508 and the base pivot 510 to move apart as the device is opened. The lid pivot 508 may also be referred to as a first pivot. The hinge pivot 512 may also be referred to a second pivot. The base pivot 510 may also be referred to as a third pivot.

In this embodiment, the extension spring 506 is attached, at one end, to the first pivot pin 500 (which is located at lid pivot 508) and, at the other end, to a base member spring pin 444.

The linkage mechanism 314 functions in a manner similar to the multi-pivot hinge 114 (as shown in FIGS. 2A to 10C) to allow translational movement or displacement of the lid member 310. Specifically, the linkage mechanism 314 can expand upwardly to allow upward displacement of the lid pivot 508, thereby allowing the translational movement of the lid member. The expansion of the linkage mechanism is allowed by rotation of the hinge lid 342 and the hinge base 344. The hinge base 344 may rotate about the base pivot 510 and is free to rotate in the counter-clockwise direction from the closed position. The hinge lid 342 may rotate about hinge pivot 512 and is free to rotate in both directions.

Starting in the closed position of the device 300 shown in FIG. 16A, the upper surfaces 358 and 386 of the inner hinge lid piece 346 and the outer hinge lid piece 348 (shown in FIGS. 12 and 13 respectively) are aligned with the inner lid member surface 318 of the lid member 310. The hinge base 344 is adjacent to the second base member recess surface 432 of the base member 312.

As the device 300 is moved from the closed position shown in FIG. 16A to the partially opened position shown in FIG. 16B, the linkage mechanism 314 expands in the upward direction. Specifically, the angled cam surface 426 of the base member 312 interacts with cam radii surface 448 of the lid member 310 to lever the lid member 310 upward in a similar manner as the angled cam surface 260 and the cam radii surface 256 (as shown in FIGS. 9A to 9C) to drive the displacement of the lid pivot 508. The interaction between cam radii surface 448 and the angled cam surface 426 drives and defines the displacement of lid pivot 508 as the lid member 310 rotates about the lid pivot 508. As the lid pivot 508 is driven upward, the hinge base 344 rotates counter clockwise and the hinge lid 342 rotates clockwise to allow the upward movement of the lid pivot 508.

As seen in FIG. 16B, which shows the device 300 in the partially opened position, the lid pivot 508 is displaced vertically with respect to its position when the device is in the closed position. The partially opened position of the device 300 shown in FIG. 16B is approximately the point of movement between the opened and closed positions where the lid member 310 is maximally displaced from the base member 312.

As the device continues to move from the partially opened position shown in FIG. 16B to the fully opened position shown in FIG. 16C, the cam radii surface 448 continues to slide along the angled cam surface 426. The lid pivot 508 moves back downward and the linkage mechanism 314 contracts. Specifically, the hinge lid 342 rotates counter-clockwise and the hinge base 344 rotates clockwise.

Turning to FIG. 16C which shows the device 300 in the fully opened position, the lid member 310 is rotated to an angle with respect to the base member 312. The lid member 310 rests on the angled cam surface 426 when the device 300 is in the opened position and the second lid member end 326 of the lid member 310 abuts or is near the first base member recess surface 430 (shown in FIG. 15) of the base member 312. The hinge lid 342 and the hinge base 344 fit together when the device 300 is in the fully opened position. Specifically, the lower surfaces 368 and 366 of the inner hinge lid piece 346 (shown in FIG. 12) which form the lower groove 370 (shown in FIG. 12) are near, or may rest on, the respective upper surfaces 400 and 402 of the hinge base 344. The upper surface 507 of the hinge lid 342 is aligned with the inner lid member surface 318 of the lid member 310. The hinge base 344 is again adjacent to the second base member recessed surface 432 of the base member 312. The overlap portion 340 of the lid member 310 overlaps the base member 312. As can be seen, the distance between the lid pivot 508 and the cam radii surface 448 which is located at the second lid member end 326 (shown in FIG. 11) is about half of the length of the overlap portion 340.

The extension spring 506 is stretched in the closed and open positions to provide a location force. During translation of the lid pivot 508 the extension spring 506 is stretched further with the cam radii surface 448/angled cam surface 426 interaction providing an over-center bias.

The assembly and interaction of the cosmetic trims 458, 460, 462 and the base cosmetic cover 456 will now be described. Turning again to FIG. 11, the inner surface of the base cosmetic cover 456 is connected to the second base member side 338 such that upper surface 464 of the base cosmetic cover 456 is aligned with inner base member surface 320, and lower surface 466 of the base cosmetic cover 456 is aligned with the outer base member surface. The inner surface of the base cosmetic trim 462 is connected to the outer surface 468 of the base cosmetic cover 456 such that their respective upper surfaces 480 and 464 (shown in FIG. 11) are generally aligned. The lid cosmetic trim 460 is similarly connected to the lid member 310. The inner surface of the mechanism cosmetic trim 458 is connected to the outer surface 380 of the hinge lid 342 such that upper surface 507 of the hinge lid 342 (shown in FIG. 16A to 16C) is aligned with the upper surface 490 of the mechanism trim 458.

Figure 17A:
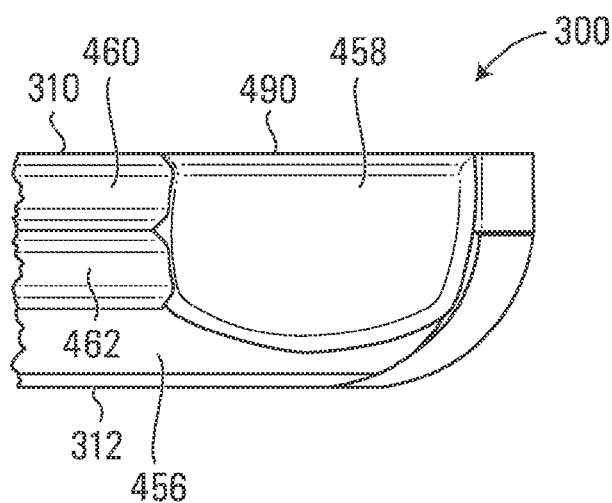
FIG. 17A is a partial side view of the mobile communication device of FIG. 11 in the closed position.
Figure 17B:
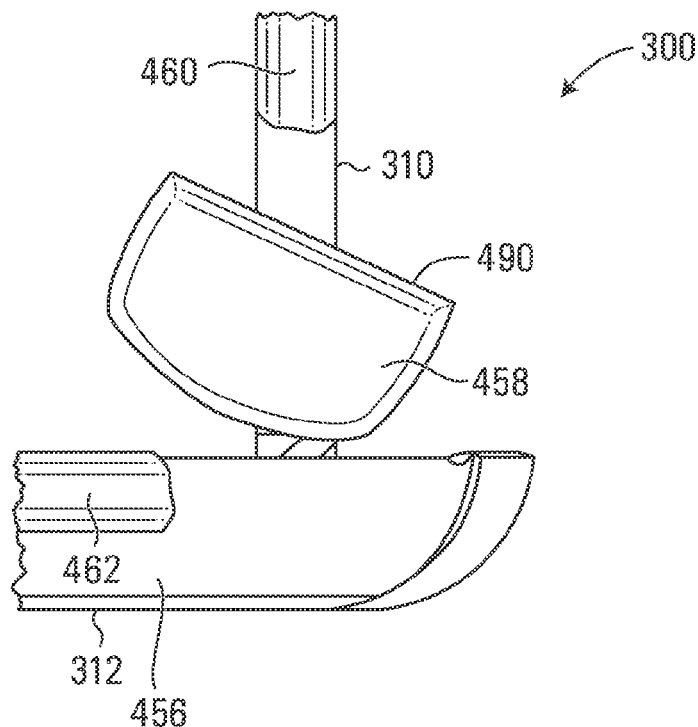
FIG. 17B is a partial side view of the mobile communication device of FIG. 11 in the partially opened position.
Figure 17C:
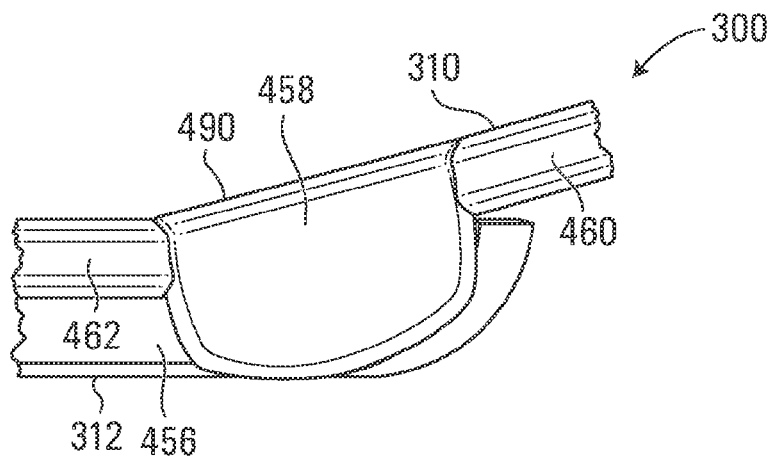
FIG. 17C is a partial side view of the mobile communication device of FIG. 11 in the fully opened position.

FIGS. 17A to 17C are enlarged partial side views of the device 300 in the closed, partially opened, and fully opened positions respectively. FIGS. 17A to 17C illustrate the positioning of cosmetic trims 458, 460, 462 and the base cosmetic cover 456 in the closed, partially opened and opened positions respectively.

When the device 300 is in the closed position shown in FIG. 17A, the upper surface 490 of mechanism cosmetic trim 458 is aligned with the outer lid member surface 319 (shown in FIG. 16A). As the device 300 is initially moved from the closed position, the mechanism cosmetic trim 458 is displaced from the base member 312, as shown in FIG. 17B. This displacement occurs because the mechanism cosmetic trim 458 is connected to the outer hinge lid piece 348 which moves as shown in FIGS. 17A to 17C.

Turning to FIG. 17C, in the opened position, the mechanism trim 458 is returned to a position closer to the base member 312, but is counter-rotated such that surface 490 is aligned with the inner lid member surface 318 of the lid member 310 (shown in FIG. 11). The linkage mechanism 314 (shown in FIGS. 16A to 16C) is hidden from the side view when the device 300 is in the closed position (shown in FIG. 17A) or in the opened position (shown in FIG. 17C).

The mechanism, lid and base cosmetic trims 458, 460, 462 and the base cosmetic cover 456 may perform aesthetic functions for the device 300 and/or protect the linkage mechanism 314. As discussed above, some embodiments may omit trims or covers.

Embodiments are not limited to linkage mechanisms comprising multi-pivot hinges as described above with reference to FIGS. 2A to 17C. For example, in some embodiments, a linkage mechanism may comprise gears rather than a pivot-hinge system. Other embodiments may implement a double hinge or expandable bands. An example of an embodiment utilizing gears will now be described with reference to FIGS. 18 to 19B.

Figure 18:
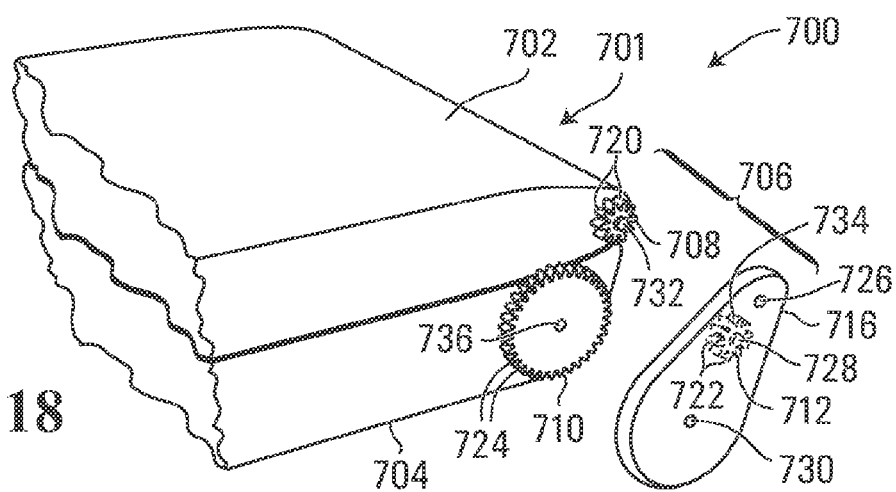
FIG. 18 is a partially exploded partial perspective view of a mobile communication device according to a fourth embodiment in a closed position.

FIG. 18 is a partial exploded perspective view of a flip phone device 700 which has a linked end 701 and a free end (not shown). The device 700 includes a first or lid member 702, a second or base member 704 and a linkage mechanism 706. The lid and base members 702 and 704 may be similar to other lid and base members described above in respect of other embodiments. Specifically, the lid member 702 may include a graphical display on its inner surface (not shown) and the base member 704 may include a keyboard on its inner surface (not shown). The lid member 702 includes an overlap portion 705 (shown in FIG. 19B).

In the remaining discussion of the device 700, the direction extending perpendicularly away from the base member 704 and toward the lid member 702, when the device 700 is in the closed position, will be referred to as the upward direction. Conversely, the opposite direction will be referred to as the downward direction. The upward and downward directions are referenced to the base member 704 which is shown as remaining stationary relative to other elements of the device 700 in all figures.

The linkage mechanism 706 includes a first or lid gear 708, a second or base gear 710, a third or transmission gear 712 and a gear housing 716. In this embodiment, the lid, transmission and base gears 708, 712 and 710 each comprise respective lid, transmission, and base gear teeth 720, 722 and 724 around their entire circumference. In other embodiments, one or more gears may not include teeth around their entire circumference. In this embodiment, the lid and transmission gears 708 and 712 have approximately 10 lid gear teeth 720 and transmission gear teeth 722 respectively, while the base gear 710 is larger than the lid and transmission gears 708 and 712 and has approximately three times as many teeth (approximately 30 base gear teeth 724). The gear housing 716 includes first, second, and third pivot holes 726, 728 and 730 for rotatably receiving gear center pins. The lid gear 708, the transmission gear 712, and the base gear 710 each have a respective one of a first, second and third gear center pins 732, 734, and 736 in their center. As will be apparent to one skilled in the art, gears may comprise more or less teeth and may have different relative sizes. Some embodiments may implement different gear size and teeth ratios than the embodiment shown in FIG. 18.

The linkage mechanism 706 rotatably couples the lid and base members 702 and 704 near the linked end 701 of the device.

In this embodiment, lid gear 708 is fixedly coupled to the lid member 702 near the linked end 701 of the device 700. The base gear 710 is fixedly coupled to the base member 704, and is located farther inward from the linked end 701 than lid gear 708. The transmission gear 712 is meshed with lid gear 708 and base gear 710. The transmission gear 712 is free to rotate about the second centre pin 734 which is located in the corresponding second pivot hole 728 of the gear housing 716. When the device is in the closed position shown in FIG. 18, the lid and transmission gears 708 and 712 are on a side of the base gear 710 near to the linked end 701 of the device. The first, second, and third gear center pins 732, 734, and 736 are received in the first, second, and third pivot holes 726, 728 and 730 of the gear housing 716 respectively. The gear housing 716 encloses at least the gears 712, 710 and 708 such that rotational movement of the gears 712, 710 and 708 is permitted within the gear housing 716. Embodiments are not limited to the gear arrangement described above, and some embodiments may utilize more gears, possibly in combination with other hinge elements. Some embodiments may omit a gear housing. For example, gears in multiples of two could be added in order to maintain the direction of translational movement.

Figure 19A:
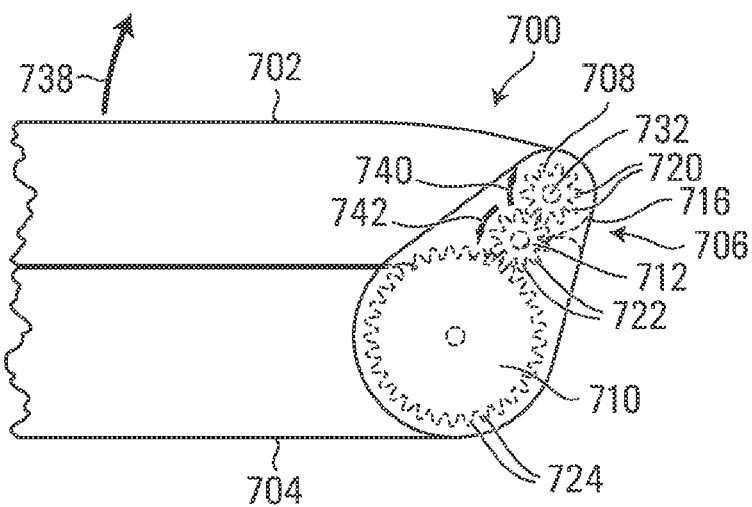
FIG. 19A is a partial side view of the mobile communication device of FIG. 18 in the closed position.
Figure 19B:
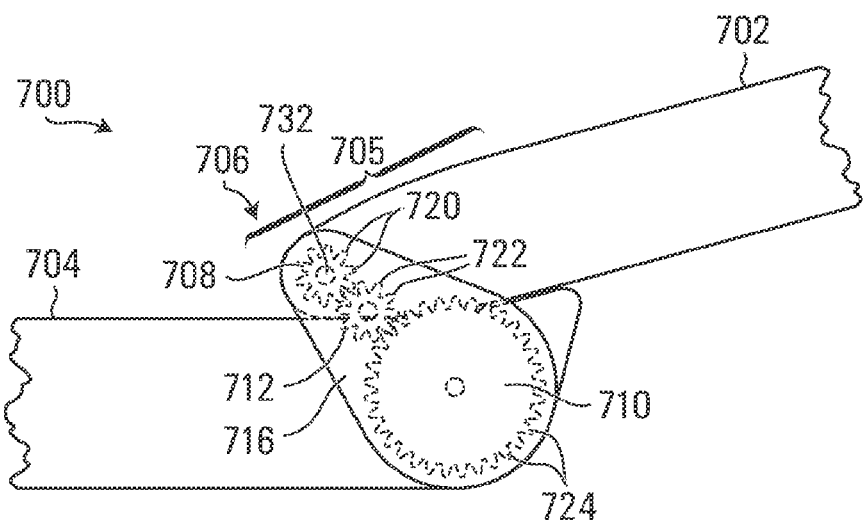
FIG. 19B is a partial side view of the mobile communication device of FIG. 19A in an opened position.

The interaction of the elements of the device 700 shown in FIG. 18 will now be described with reference to FIGS. 19A and 19B. FIGS. 19A and 19B are partial side views of the device 700 which shows the device 700 in closed and opened positions respectively. In the opened position shown in FIG. 19B, the overlap portion 705 of the lid member 702 overlaps the base member 704 at the linked end 701 of the device 700, and the lid member 702 is at an angle with respect to the base member 704, although embodiments are not so limited. The lid member 702 rests against the base member 704. The base member 704 is shown as remaining stationary for the purposes of showing relative movement of the elements of the device 700, but it is to be understood that the base member need not remain stationary when the device 700 is opened.

The transmission gear teeth 722 interact with the lid gear teeth 720 and the base gear teeth 724 respectively to transfer rotation and movement from one gear to another. Specifically, as the device 700 is opened, the lid member 702 rotates about the position of the first gear center pin 732. This rotation is transferred, via the lid gear 708, to the transmission gear 712. The transmission gear 712 rotates (counter clockwise in FIGS. 19A and 19B) with respect to the base gear 710. The rotation of the transmission gear 712 causes the transmission gear 712 to travel around the circumference of the base gear 710 away from the linked end 701 (shown in FIG. 18). This travel of the transmission gear 712 drives rotational movement of the gear housing 716 about the third gear center pin 736 which passes through the gear housing 716, the base gear 710 and into the base member 704. The transmission gear 712 reverses the direction of rotation translated to the base gear 710 from the lid gear 708. Therefore, the linkage mechanism 706 actuates translational movement of the lid member 702 away from the linked end 701 as the device 700 is opened. First, second, and third arrows 738, 740, and 742 in FIG. 19A illustrate the direction of movement of the lid member 702, lid gear 708, and transmission gear 712 as the device 700 is moved from the closed position. The lid gear 708 moves coincidentally with the lid member 702. Closing the device 700 will reverse the movements described above.

There is a relationship between the ratio of lid gear teeth 720 to base gear teeth 724 and the range of motion of the lid member 702. The size of the transmission gear 712 has no effect on the rotation or translation of the lid member 702. The points of contact between the transmission gear 712 and each of the lid and base gears 708 and 710 travel around the lid gear 708 circumference and the base gear 710 circumference respectively. The amount the point of contact between the transmission gear 712 and the base gear 710 travels around the base gear 710 is equal to the translation angle of the base gear 710. In the present embodiment, an opening angle of 160 degrees between the lid and base members 702 and 704 of the device 700 is implemented. Additionally, a forward translation around the base gear of 80 degrees is implemented to provide the overlap. However, other embodiments may implement other angles and/or overlap of the lid and base members 702 and 704.

In this case, the translation angle of the base gear 710 is approximately 80 degrees, although embodiments may have different translation angles. The amount the transmission gear 712 travels around the lid gear 708 is equal to the travel around the base gear (80 degrees in this embodiment), plus the opening angle of the lid member 702. In this embodiment, the lid member 702 opens to 160 degrees with respect to the base member 704. Therefore, the transmission gear 712 travels 240 degrees around the lid gear 708. Translation of 240 degrees around the lid gear 708 and 80 degrees around the base gear 710 produces a ratio of 240/80 or 3:1. The range of motion and amount of overlap can be modified by changing this ratio.

Other embodiments may implement different gear ratios and arrangements to achieve similar or different translational movement of a lid member. For example, if the translation around base gear 710 was chosen to be 40 degrees, and the opening angle remained the same (160 degrees) then the translation around the lid gear 708 will be 200 degrees (160+40) providing a ratio of 200/40=5:1.

In embodiments, including the embodiments described above, a user may act upon lid and base members of a device in various locations and in various ways to rotate the lid member with respect to the base member. For certain mobile communication device hinge designs, there may be at least one position of the device where the lid and base members jam or experience undesired movement depending on how/where a user acts upon the device. A position where such undesirable movement, or prevention of movement, could be experienced may be referred to as a "dead spot". In the embodiments described with reference to FIGS. 1 to 19B, the particular linkage mechanisms described may preclude the presence of a "dead spot", regardless of where a user acts upon the mobile communication device.

The embodiments described above are only examples of possible embodiments, and yet another example embodiment will now be described with reference to FIGS. 20A to 20C.

FIGS. 20A to 20C are partial side views of a flip phone device 800 in closed, partially opened, and fully opened positions respectively. The device 800 has a linked end 801 and an opposite free end (not shown). The device 800 includes a first or lid member 802, a second or base member 804 and a linkage mechanism 806. The lid and base members 802 and 804 may be similar to other lid and base members described above in respect of other embodiments. Specifically, the lid member 802 may include a graphical display on an inner surface (not shown) and the base member 804 may include a keyboard on an inner surface (not shown). The lid member 802 includes an overlap portion 807 (shown in FIG. 20C)

In the remaining discussion of the device 800, the direction extending perpendicularly away from the base member 804 and toward the lid member 802, when the device 800 is in the closed position, will be referred to as the upward direction. Conversely, the opposite direction will be referred to as the downward direction. The upward and downward directions are referenced to the base member 804 which is shown as remaining stationary relative to other elements of the device 800 in all figures.

The linkage mechanism 806 includes a first link 808 and a second link 810. The first link 808 has an upper end 812 and a lower end 814. First and second pivots 816 and 818 are disposed near the upper and lower ends 812 and 814 of the first link 808 respectively. The second link 810 has an upper end 820 and a lower end 822. Third and fourth pivots 824 and 826 are disposed near the upper and lower ends 820 and 822 of the second link 810 respectively. The upper ends 812 and 820 of the first and second link are each convexly curved. The first and second links 808 and 810 each have a respective side edge 828 and 830 which faces the respective other link 808 and 810. Each of the first and the second links 808 and 810 also comprise a respective recess 832 and 834 in their respective side edge 828 and 830, and which is disposed toward the respective upper end 812 and 820 of the first and second links 808 and 810. The recesses 832 and 834 of the first and second links 808 and 810 are concavely curved and are shaped complimentary to upper ends 820 and 812 of the second and first links 810 and 808 respectively. The lid member 802 has a first lid member end (not shown) and an opposite second lid member end 836. The base member has a first base member end (not shown) and an opposite second base member end 837.

The direction extending from the second base member end 837 toward the opposite first base member end will be referred to as the forward direction. Conversely, the opposite direction will be referred to as the backward direction.

The second and fourth pivots 818 and 826 are disposed a first distance apart, horizontally, on the base member 804. The second pivot 818 is positioned forward from the fourth pivot 826. The first and third pivots 816 and 824 are disposed a second, shorter, distance apart on the lid member 802. The first and third pivots 816 and 824 are positioned near the second lid member end 836 such that the pivot 824 is above the pivot 816, and the upper end 812 of the first link 808 is below and adjacent to the upper end 820 of the second link 810 when the device 800 is in the closed position. When the device 800 is in the closed position shown in FIG. 20A, the pivot 816 is disposed below the pivot 824 and the end 812 of the first link 808 is received in the recess 834 of the second link 810. In the closed position, the second link 810 is generally aligned in the upward direction, and the first link 808 is diagonally aligned. The upper ends 812 and 820 of the first and second 808 and 810 links are disposed near the linked end 801 of the device 800.

The linkage mechanism 806 rotatably couples the lid and base members 802 and 804 near the linked end 801 of the device. Specifically, the first link 808 is rotatably coupled to the lid member 802 by the first pivot 816 and to the base member 804 by the second pivot 818. The second link 810 is rotatably coupled to the lid member 802 by the third pivot 824 and to the base member 804 by the fourth pivot 826. The recesses 832 and 834 may receive the upper ends 820 and 812 of the other link respectively.

As the device 800 is moved from the closed position shown in FIG. 20A to the partially opened position shown in FIG. 20B, the lid member 802 is rotated (clockwise in FIGS. 20A to 20C) with respect to the base member 804. As the lid member 802 rotates clockwise, the first and third pivots 816 and 824 rotate clockwise around each other. The rotation of the first and third pivots 816 and 824 causes the first and second links 808 and 810 to disengage. As can be seen in FIG. 20B, the rotation of the first and third pivots 816 and 824 around each other initially drives counter-clockwise rotation of the first and second links 808 and 810 about second and fourth pivots 818 and 826. The rotation of the first and second links 808 and 810 moves lid member 802 forward, and thus, the first and second links 808 and 810 actuate translational movement of the lid member 802.

As the device continues to move from the partially opened position shown in FIG. 20B to the fully opened position shown in FIG. 20C, the first and third pivots 816 and 824 will continue to rotate clockwise and the first and second links 808 and 810 will continue to rotate counter-clockwise about pivots 818 and 826 respectively.

Turning to FIG. 20C, the second link 810 is received into the recess 832 of the first link 808. The recess 832 of the first link 808 and the upper end 820 of the second link 810 act as a physical stop preventing further rotation of the lid member in the opening direction. The overlap portion 807 of lid member 802 in the opened position overlaps the base member 804 at the linked end 801 of the device 800 as a result of the translational movement of the lid member as the first and second links 808 and 810 rotated from their respective positions shown in FIG. 20A to their respective positions shown in FIG. 20C.

The embodiments disclosed herein and shown in FIGS. 1 to 20C each provide an opened position wherein a lid member overlaps the base member, thereby reducing the overall length of the device in the opened position in comparison with a conventional mobile communication device. These embodiments may allow for a large user interface such as a display or touchscreen to be housed in the lid member without unduly increasing the size of the device when opened. Furthermore, the embodiments described with reference to FIGS. 2 to 20C also provide translational movement of the lid member during movement between the closed and opened positions, thereby reducing clearance space required in the base member to allow movement of the lid member. What has been described is merely illustrative of the application of the principles of some embodiments. Other arrangements and methods can be implemented by those skilled in the art without departing from the spirit and scope of the application.

The invention claimed is:
1. A mobile communication device comprising:
a first member having a user interface;
a second member; and
a linkage mechanism coupling the first member and the second member such that the device has a closed position and an opened position, the linkage mechanism comprising an expandable multi-pivot hinge, wherein
in the closed position, the user interface is inaccessible,
in the opened position, the user interface is accessible and a portion of the first member overlaps the second member,
the expandable multi-pivot hinge comprises a first hinge piece and a second hinge piece,
the first hinge piece is pivotably coupled to the first member via a first pivot and to the second hinge piece via a second pivot,
the second hinge piece is pivotably coupled to the second member via a third pivot, such that the first hinge piece and the second hinge piece can rotate with respect to each other to allow expansion of the multi-pivot hinge, and
a combined distance between the first pivot and the second pivot and between the second pivot and the third pivot is greater than a distance between the first pivot and the third pivot when the device is in either the opened position or the closed position.

2. The device of claim 1, wherein the user interface is a graphical display or a touchscreen.

3. The device of claim 1, wherein the device actuates translational movement of the first member responsive to movement of the device from the closed position to the opened position and responsive to movement of the device from the opened position to the closed position.

4. The device of claim 3, wherein the second member includes a cam surface for sliding contact with an end of the first member, said cam surface driving the linkage mechanism to actuate the translational movement of the first member.

5. The device of claim 3, wherein the linkage mechanism actuates the translational movement of the first member responsive to the movement of the device from the closed position to the opened position and responsive to the movement of the device from the opened position to the closed position.

6. The device of claim 1, wherein the linkage mechanism is pivotably connected to the first member, via the first pivot, at a distance from an end of the first member, the distance from the end of the first member defining approximately half of a length of the portion of the first member overlapping the second member.

7. The device of claim 1, wherein a bias element is connected between the first member and the second member.

8. The device of claim 1, wherein the expandable multi-pivot hinge comprises a pin and the second member further comprises a guide, the guide engaging the pin and restricting movement of the pin to travel within the guide to prevent hyper-extension of the expandable multi-pivot hinge.

9. The device of claim 1, wherein the linkage mechanism is located inward from at least one side of the device.

10. The device of claim 1, further comprising one or more coverings which at least partially hide the linkage mechanism, the coverings comprising at least one of a trim and a cover.

11. A mobile communication device comprising:
a first member having a user interface;
a second member;
a linked end; and a linkage mechanism coupling the first member and the second member near the linked end such that the device has a closed position and an opened position, the linkage mechanism comprising:

a first gear fixedly coupled to the first member;

a second gear fixedly coupled to the second member; and a third gear meshed with each of the first and second gears to transfer rotation therebetween, wherein in the closed position, the user interface is inaccessible, and in the opened position, the user interface is accessible and a portion of the first member overlaps the second member, and as the device is moved from the closed position to the open position, the first member rotates with respect to the second member, said rotation being transferred to the third gear via the first gear and causing the third gear to travel around a circumference of the second gear in a direction away from the linked end.

12. The device of claim 11, wherein the device actuates translational movement of the first member responsive to movement of the device from the closed position to the opened position and responsive to movement of the device from the opened position to the closed position.

13. A mobile communication device comprising:

a first member having a user interface; a second member; a linked end; and a linkage mechanism coupling the first member and the second member near the linked end such that the device has a closed position and an opened position, the linkage mechanism comprising:

a first link having a first end, a second end, and a recess, the first link being pivotably connected, at the first end of the first link, to the first member by a first pivot and pivotably connected, at the second end of the first link, to the second member by a second pivot;

a second link having a first end, a second end, and a recess, the second link being pivotably connected, at the first end of the second link, to the first member by a third pivot and pivotably connected, at the second end of the second link, to the second member by a fourth pivot, wherein the second and fourth pivots are disposed a first distance apart lengthwise on the second member, the first and third pivots are disposed a second, shorter, distance apart on the first member, in the closed position: the user interface is inaccessible; the second link is nearer to the linked end than the first link; the first pivot of the first link is nearer to the second member than the third pivot of the second link; and the first end of the first link is received in the recess of the second link, and in the opened position: the user interface is accessible; the third pivot of the second link is nearer to the second member than the first pivot of the first link; and the first end of the second link is received in the recess of the first link and a portion of the first member overlaps the second member.

14. The device of claim 13, wherein the device actuates translational movement of the first member responsive to movement of the device from the closed position to the opened position and responsive to movement of the device from the opened position to the closed position.

15. A linkage mechanism for rotatably coupling a first member and a second member of a mobile communication device, at a linked end of the communication device, such that the device has an opened position and a closed position, comprising:

a first gear fixedly coupled to the first member;

a second gear fixedly coupled to the second member;

a third gear meshed with each of the first and second gears to transfer rotation therebetween, wherein in the closed position, a user interface of the first member is inaccessible and in the opened position, the user interface is accessible and a portion of the first member overlaps the second member, the linkage mechanism actuates translational movement of the first member for at least part of movement of the device from the closed position to the opened position and at least part of movement of the device from the opened position to the closed position, and as the device is moved from the closed position to the open position, the first member rotates with respect to the second member, said rotation being transferred to the third gear via the first gear and causing the third gear to travel around a circumference of the second gear in a direction away from the linked end.

* * * * *